United States Patent
Zhu et al.

(10) Patent No.: US 9,575,917 B1
(45) Date of Patent: Feb. 21, 2017

(54) PROTOCOL FOR DIGITAL AUDIO-VIDEO INTERFACE

(71) Applicant: Analogix Semiconductor, Inc., Santa Clara, CA (US)

(72) Inventors: Ning Zhu, San Jose, CA (US); Haiping Liu, Beijing (CN); Xin Wang, Beijing (CN); Xiao Yong, Beijing (CN); Hongdong Song, Beijing (CN); Yueke Tang, Beijing (CN); Soumendra Mohanty, San Jose, CA (US); Greg Stewart, Niwot, CO (US); JC Zhang, Beijing (CN)

(73) Assignee: Analogix Semiconductor, Inc., Santa Clara, CA (US)

( * ) Notice: Subject to any disclaimer, the term of this patent is extended or adjusted under 35 U.S.C. 154(b) by 121 days.

(21) Appl. No.: 14/473,754

(22) Filed: Aug. 29, 2014

Related U.S. Application Data

(60) Provisional application No. 61/872,273, filed on Aug. 30, 2013.

(51) Int. Cl.
  *G06F 3/038* (2013.01)
  *G06F 13/38* (2006.01)
  *G06F 17/30* (2006.01)

(52) U.S. Cl.
  CPC ....... *G06F 13/385* (2013.01); *G06F 17/30017* (2013.01)

(58) Field of Classification Search
  CPC .......................... G06F 13/385; G06F 17/30017
  USPC .......................................................... 710/63
  See application file for complete search history.

(56) References Cited

U.S. PATENT DOCUMENTS

| | | | | |
|---|---|---|---|---|
| 2007/0143509 A1* | 6/2007 | Ni | ............... | G06F 12/1416 710/100 |
| 2009/0248924 A1* | 10/2009 | Melin | ............... | G09G 5/006 710/63 |
| 2011/0126005 A1* | 5/2011 | Carpenter | ............... | G06F 13/385 713/158 |
| 2011/0271019 A1* | 11/2011 | Ishii | ............... | G06F 13/385 710/63 |
| 2012/0102244 A1* | 4/2012 | Shiraishi | ............... | G06F 13/385 710/63 |
| 2012/0203937 A1* | 8/2012 | Mohanty | ............... | G06F 13/385 710/16 |

(Continued)

*Primary Examiner* — Idriss N Alrobaye
*Assistant Examiner* — Brooke Taylor
(74) *Attorney, Agent, or Firm* — Carr & Ferrell LLP

(57) ABSTRACT

Provided are methods and systems for selectively communicating data between a source device and one or more sink devices. The method includes generating a selection signal based on received configuration data associated with the sink device(s). Based at least in part on the selection signal, the data can be caused to be selectively provided to the sink device(s) by the first device. The data includes Universal Serial Bus (USB) protocol data, uncompressed high definition media data, or a combination thereof. In forward connections, the data may be provided variously at one of the following rates: 2.7 Gbps, 5.4 Gbps, 3.375 Gbps, and 6.75 Gbps. At 6.75 Gbps, the data may include a combination of USB data and audio/video data (having high resolution high definition video) or just standalone audio/video data (having higher resolution high definition video). In backward connections, the data includes USB data and can be transferred at either 2.7 Gbps and 3.375 Gbps.

22 Claims, 26 Drawing Sheets

(56) References Cited

U.S. PATENT DOCUMENTS

| | | | |
|---|---|---|---|
| 2013/0166813 A1* | 6/2013 | Chandra | G06F 13/385 710/316 |
| 2013/0191872 A1* | 7/2013 | Lee | H04N 21/43615 725/78 |
| 2013/0244491 A1* | 9/2013 | Sarwar | H01R 24/60 439/655 |
| 2014/0205018 A1* | 7/2014 | Itoh | H04N 19/46 375/240.25 |
| 2014/0317320 A1* | 10/2014 | Chien | G06F 13/385 710/14 |

* cited by examiner

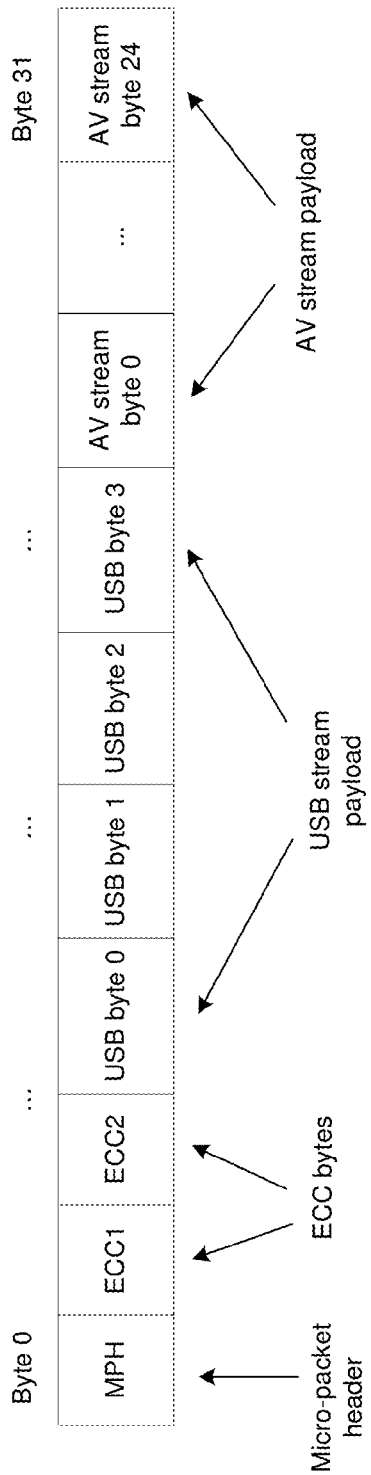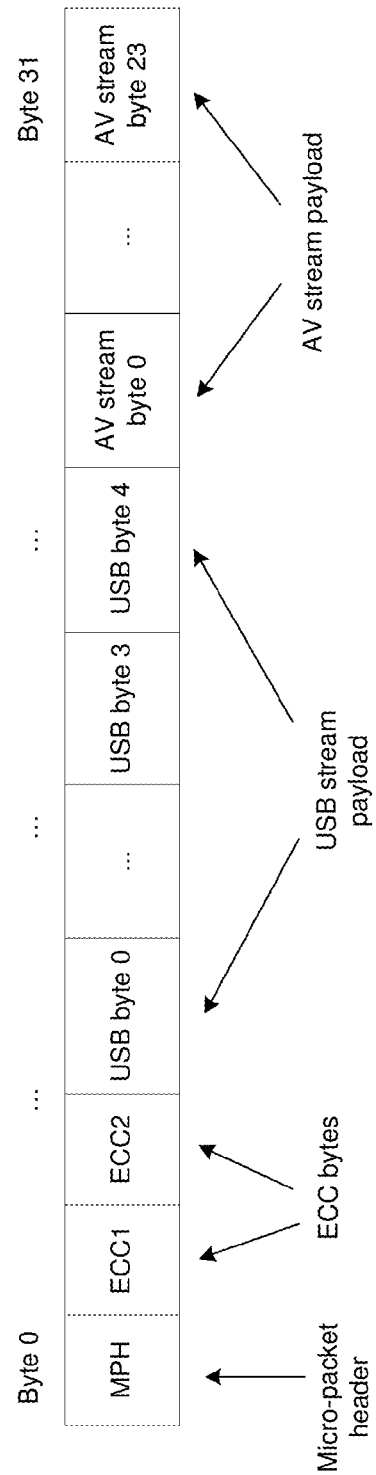
FIG. 5A
FIG. 5B

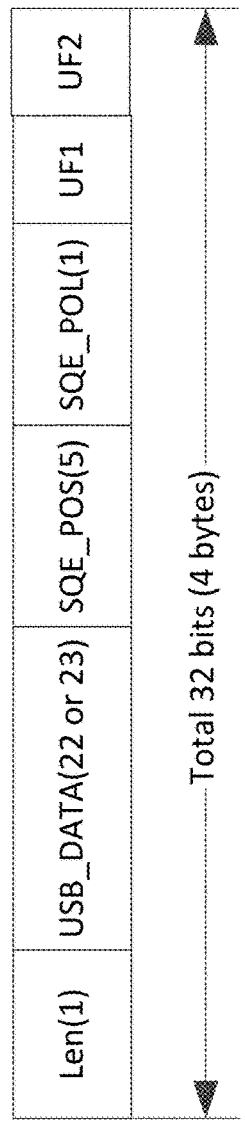

| Len(1) | USB_DATA(22 or 23) | SQE_POS(5) | SQE_POL(1) | UF1 | UF2 |

←———————— Total 32 bits (4 bytes) ————————→

Len: Total number of valid USB data bits in this payload
   0: 22 bits,
   1: 23 bits.
SQE_POS: Squelch toggle position.
   0: no toggle,
   others: toggle happens after the bit number pointed to by SQE_POS
SQE_POL: Squelch toggle polarity.
   0: Squelch toggle from high to low (negative edge),
   1: Squelch toggle from low to high (positive edge).
USB_DATA: Recovered USB data (22 or 23 bits)
UF1, UF2: User defined flag bits. Vendor specific.

FIG. 7A

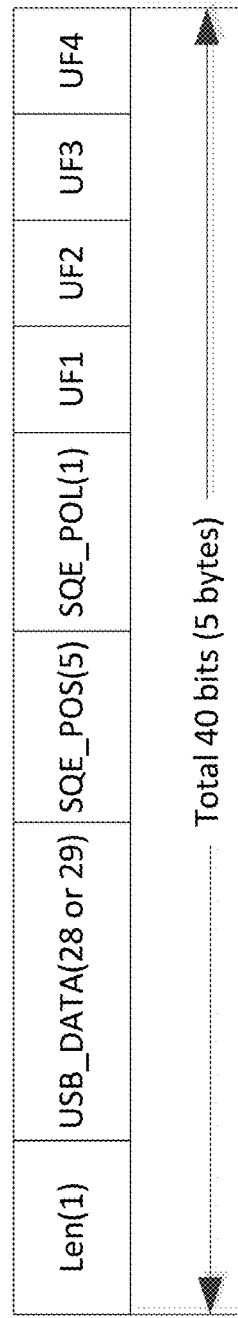

| Len(1) | USB_DATA(28 or 29) | SQE_POS(5) | SQE_POL(1) | UF1 | UF2 | UF3 | UF4 |

Total 40 bits (5 bytes)

Len: Total number of valid USB data bits in this payload
    0: 28 bits,
    1: 29 bits.
SQE_POS: Squelch toggle position.
    0: no toggle,
    others: toggle happens after the bit number pointed to by SQE_POS
SQE_POL: Squelch toggle polarity.
    0: Squelch toggle from high to low (negative edge),
    1: Squelch toggle from low to high (positive edge).
USB_DATA: Recovered USB data (28 or 29 bits)
UF1,…UF4: User defined flag bits. Vendor specific.

FIG. 7B

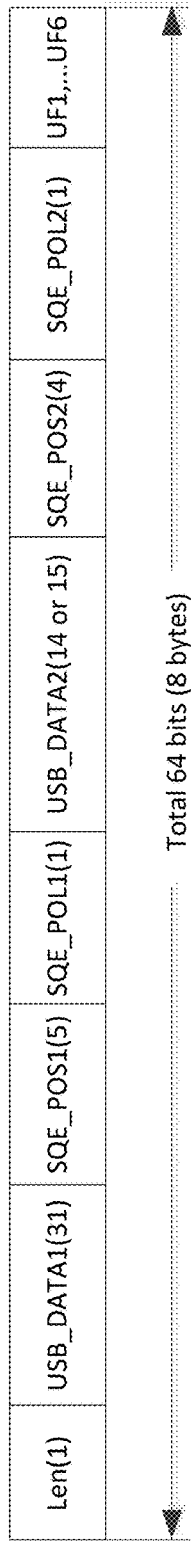

| Len(1) | USB_DATA1(31) | SQE_POS1(5) | SQE_POL1(1) | USB_DATA2(14 or 15) | SQE_POS2(4) | SQE_POL2(1) | UF1,...UF6 |

Total 64 bits (8 bytes)

Len: Total number of valid USB data bits in this payload
    0: 45 bits,
    1: 46 bits.
SQE_POS1: Squelch toggle position for the first 31 USB data bits.
    0: no toggle,
    others: toggle happens after the bit number pointed to by SQE_POS1
SQE_POL1: The first Squelch toggle polarity
    0: Squelch toggle from high to low (negative edge),
    1: Squelch toggle from low to high (positive edge).
USB_DATA1: The first 31 bits of recovered USB data.
SQE_POS2: Squelch toggle position for the remaining USB data bits.
    0: no toggle,
    others: toggle happens after the bit number pointed to by SQE_POS2
SQE_POL2: The second Squelch toggle polarity
    0: Squelch toggle from high to low (negative edge),
    1: Squelch toggle from low to high (positive edge).
USB_DATA2: The remaining 14 or 15 bits of recovered USB data.
UF1,...UF6: User defined flag bits(total 6). Vendor specific.

FIG. 7C

| Len(1) | USB_DATA1(31) | SQE_POS1(5) | SQE_POL1(1) | USB_DATA2(25 or 26) | SQE_POS2(5) | SQE_POL2(1) | UF1 | UF2 |

◄------------------------------- Total 72 bits (9 bytes) -------------------------------►

Len: Total number of valid USB data bits in this payload
  0: 56 bits,
  1: 57 bits.
SQE_POS1: Squelch toggle position for the first 31 USB data bits.
  0: no toggle,
  others: toggle happens after the bit number pointed to by SQE_POS1
SQE_POL1: The first Squelch toggle polarity
  0: Squelch toggle from high to low (negative edge),
  1: Squelch toggle from low to high (positive edge).
USB_DATA1: The first 31 bits of recovered USB data.
SQE_POS2: Squelch toggle position for the remaining USB data bits.
  0: no toggle,
  others: toggle happens after the bit number pointed to by SQE_POS2
SQE_POL2: The second Squelch toggle polarity
  0: Squelch toggle from high to low (negative edge),
  1: Squelch toggle from low to high (positive edge).
USB_DATA2: The remaining 25 or 26 bits of recovered USB data.
UF1, UF2: User defined flag bits. Vendor specific.

FIG. 7D

For 6.75Gbps mode:
{4'h0, MPH[7:4], MPH[3:0], USB byte 0[7:4], USB byte 0[3:0], USB byte 1[7:4], USB byte 1[3:0], USB byte 2[7:4], USB byte 2[3:0], USB byte 3[7:4], USB byte 3[3:0], ECC1[7:4], ECC1[3:0], ECC2[7:4], ECC2[3:0]}

Or

For 5.4Gbps mode:
{ MPH[7:4], MPH[3:0], USB byte 0[7:4], USB byte 0[3:0], USB byte 1[7:4], USB byte 1[3:0], USB byte 2[7:4], USB byte 2[3:0], USB byte 3[7:4], USB byte 3[3:0], USB byte 4[7:4], ECC1[7:4], ECC1[3:0], ECC2[7:4], ECC2[3:0]}

FIG. 9

For 3.375Gbps mode:

{4'h0, 4'h0, 4'h0, MPH[7:4], MPH[3:0], USB byte 0[7:4], USB byte 1[7:4], USB byte 2[7:4], USB byte 3[7:4], USB byte 4[7:4], USB byte 5[7:4], USB byte 6[7:4], USB byte 7[7:4], ECC1[7:4], ECC1[3:0]}   and {4'h0, 4'h0, 4'h0, MPH[7:4], MPH[3:0], USB byte 0[3:0], USB byte 1[3:0], USB byte 2[3:0], USB byte 3[3:0], USB byte 4[3:0], USB byte 5[3:0], USB byte 6[3:0], USB byte 7[3:0], ECC2[7:4], ECC2[3:0]}

For 2.7Gbps mode:

{4'h0, 4'h0, 4'h0, MPH[7:4], MPH[3:0], USB byte 0[7:4], USB byte 1[7:4], USB byte 2[7:4], USB byte 3[7:4], USB byte 4[7:4], USB byte 5[7:4], USB byte 6[7:4], USB byte 7[7:4], USB byte 8[7:4], ECC1[7:4], ECC1[3:0]}          and {4'h0, 4'h0, 4'h0, MPH[7:4], MPH[3:0], USB byte 0[3:0], USB byte 1[3:0], USB byte 2[3:0], USB byte 3[3:0], USB byte 4[3:0], USB byte 5[3:0], USB byte 6[3:0], USB byte 7[3:0], USB byte 8[7:4], ECC2[7:4], ECC2[3:0]}

FIG. 10

{4'h0, 4'h0, 4'h0, 4'h0, 4'h0, 4'h0, 4'h0, MPH[7:4], MPH[3:0], ECC1[7:4], ECC1[3:0], ECC2[7:4], ECC2[3:0]}

FIG. 11

MPH: Packet header byte.
UF: User defined flags.
DATA_LEN: Valid USB data in this uPacket RX. 1-1024.
USB_DATAi: the ith group of the USB data. Each group has 32 bits of data.
ECCx: the ECC check bytes.

{20'h0, MPH[7:0], DATA_LEN[9:0], UF[5:0], ECC[15:0]}

{12'h0, USB_DATA1[31:0], ECC1[15:0]}

{12'h0, USB_DATA2[31:0], ECC2[15:0]}

...

{12'h0, USB_DATAn[31:0], ECCn[15:0]}

FIG. 14

PROTOCOL FOR DIGITAL AUDIO-VIDEO INTERFACE

CROSS-REFERENCE TO RELATED APPLICATION

The present application claims the benefit of U.S. Provisional Application No. 61/872,273, filed on Aug. 30, 2013. The subject matter of the aforementioned application is incorporated herein by reference for all purposes.

TECHNICAL FIELD

This disclosure relates generally to data communications, and more particularly, to methods and systems for transferring uncompressed audio/video data and USB data.

BACKGROUND

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

A Universal Serial Bus (USB) communication standard is directed to a universal wired interface and protocol to enable electronic devices to exchange data. Various connectors are specified for information exchange in accordance with the standard. One or more dedicated USB ports, i.e., USB connectors, are typically employed in an electronic device. There are three basic types of connectors identified in various USB 2.0 Specifications: Standard, Mini-USB, and Micro-USB connectors. According to USB 3.0 Specifications, two basic types of connectors are defined: standard and Micro-USB connectors. A USB port of a device can be coupled to a USB port of another device via a cable. A USB transceiver may be employed in each device to send and receive USB protocol signals to and from the corresponding USB port. Additionally, the USB protocol can define the power and ground connectivity between two devices.

A DisplayPort (DP) communication standard is an interface and link protocol for transferring high definition video/audio data across computer systems and electronics devices. The Video Electronics Standards Association (VESA) has defined various standards versions, which are incorporated by reference herein, including versions 1.1, 1.1a, 1.2, and 1.2a. The DisplayPort standard defines a multi-laned one-way serial interface for connecting a source device, such as a system that generates a media or multimedia signal, i.e., video and/or audio, with a sink device, such as a display that renders the signal on an output device. Additionally, the DisplayPort standard defines a two way serial communication side-band channel, along with the multi-laned serial interface, for device configurations on either side of the connected link to identify and set the correct transmission of the multimedia content. The DP communications standard is defined by the VESA as royalty free.

The DP protocol is scalable in terms of usable bandwidth and has a higher bandwidth than the high definition multimedia interface (HDMI) standard. The DP protocol uses one to four pairs of communication lines (also referred to as lanes) depending on the bandwidth needed to transmit a single video/audio stream. Where the link does not need four lanes to transfer information, one or two lanes can also be used to transfer one stream of video/audio data or multiple streams/displays of video/audio data depending on the bandwidth needed. The two-way serial communication side-band channel is responsible for setting up the lanes requirement and other communications on both sides.

A dedicated DP protocol connector can be employed in a device for multimedia content communication with an external device in accordance with the DP communication standard. Most electronic devices that support wired data communication employ one or more USB connectors but do not include a DP protocol connector due to the size or upgradability limitations. Such electronic devices may include set-top boxes and handheld communication devices, such as, for example, mobile telephones, tablets, digital still cameras, digital video camcorders, mp4 players, and media players.

However, existing solutions do not provide an efficient system for communicating with devices having different communication protocols. More specifically, the existing solutions do not provide a definition for an enhanced protocol, based on the DisplayPort standard and MyDP standard, as a digital audio-video interface as well as a USB 2.0 data interface connectivity between a transmitter (source) device and a receiver (sink) device using a standard 5-pin connector. Such enhanced protocol can be referred to as Slimport AVD or Slimport Pro, an extension of SlimPort 1.0 specification.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The techniques disclosed herein may provide for simultaneous transfer of high-definition audio-video stream together with USB 2.0 data stream over a 5-pin connector, such as but not limited to, micro-USB connector. For example, with the link speed up to 6.75 Gbps the Slimport AVD interface may transfer 1080p@60 Hz video format together with USB 2.0 data or transfer 4K2K (16 bpp, 30 Hz) in standalone video mode. In some embodiments, the standalone video mode is not limited to 4K2K, other suitable video resolutions may be transferred. Alternatively, a USB 3.0 micro-USB connector may be used. Slimport AVD (also referred to herein as Slimport Pro) is backward compatible with the SlimPort 1.0 specification and MyDP 1.0 standards (which standards are incorporated by reference herein.)

According to an aspect of the present disclosure, an example method for selectively communicating data between a first device and a second device is provided. The example method may commence with receiving configuration data associated with the second device. Method may include generating a selection signal based on the configuration data. Method may further include causing, based at least in part on the selection signal, the data to be selectively provided to the second device by the first device, the data including at least one of the following: Universal Serial Bus (USB) protocol data and uncompressed high definition media data. In some embodiments, the data can be provided from a port associated with the first device to a media connector associated with second device via an electrical circuit. The electrical circuit can be coupled to the port and the media connector by an electrical cable.

In various embodiments, the second device may be configured to receive the data using at least one of the following standards: DisplayPort data, high definition multimedia interface (HDMI), and Digital Video Interactive (DVI).

According to various embodiments, the data is provided at one of a first data transfer rate, a second data transfer rate, a third data transfer rate, and a fourth data transfer rate, the first data transfer rate being 2.7 Gbps, the second data transfer rate being 5.4 Gbps, the third data transfer rate being 3.375 Gbps, the fourth data transfer rate being 6.75 Gbps. When being provided at the fourth data transfer rate, the provided data may include one of the following a combination of video data and USB 2.0 data or standalone video data.

In some embodiments, the uncompressed high definition media data can be provided from the first to the second device in a burst mode by building a first line buffer in the first device and a second line buffer in the second device.

In certain embodiments, the method may further include causing the data to be selectively provided by the second device to the first device based on the selection signal. (This is also referred to herein as "backward", whereas from the first device to the second device is also referred to herein as "forward".) The data can be provided from the second device to the first device at one of a fifth data transfer rate and a sixth data transfer rate, the fifth data transfer rate being 2.7 Gbps and the sixth data transfer rate being 3.375 Gbps. The data may include USB protocol data. The USB data may be provided by the second device to the first device in a burst mode by building a first line buffer in the first device and a second line buffer in the second device.

In some embodiments, the provided data may further include side-band communication data. The side-band communication data can be provided from the first device to the second device and from the second device to the first device via a single pin of a port associated with the first device at one of 2 Mbps, 5 Mbps, and 10 Mbps.

Additionally provided is a system for selectively communicating data between a first device and a second device. The example system includes a universal serial bus (USB) connector having a first plurality of pins, a media connector having a second plurality of pins, an electrical cable coupling the USB connector to the media connector. The electrical cable includes a plurality of conductors. The system can further include a circuit coupled to at least some of the plurality of conductors of the electrical cable at points between ends of the first plurality of pins of the USB connector and ends of the second plurality of pins of the media connector. The circuit is configured to receive configuration data associated with the second device, generate a selection signal based on the configuration data, and, based at least in part on the selection signal, cause the data to be selectively provided to the media connector, such that the supplied data can be transmitted via the media connector to the second device, the data including at least one of the following: Universal Serial Bus (USB) protocol data and uncompressed high definition media data.

In some embodiments, the second device is configured to receive the data using at least one of the following standards: DisplayPort data, high definition multimedia interface (HDMI), and Digital Video Interactive (DVI).

In various embodiments, the data is provided at one of a first data transfer rate, a second data transfer rate, a third data transfer rate, and a fourth data transfer rate, the first data transfer rate being 2.7 Gbps, the second data transfer rate being 5.4 Gbps, the third data transfer rate being 3.375 Gbps, and the fourth data transfer rate being 6.75 Gbps. When being provided at the fourth data transfer rate, the data includes one of the following: a combination of audio/video data and USB 2.0 data and standalone audio/video data. In some embodiments, the uncompressed high definition media data is provided in a burst mode by building a first line buffer in the first device and a second line buffer in the second device.

In some embodiments, the circuit may further be configured to cause the data to be selectively provided by the second device to the first device based on the selection signal. The data from the second device to the first device can be provided at one of a fifth data transfer rate and a sixth data transfer rate, the fifth data transfer rate being 2.7 Gbps and the sixth data transfer rate being 3.375 Gbps. In some embodiments, the USB protocol data can be provided by the second device to the first device in a burst mode by building a first line buffer in the first device and a second line buffer in the second device.

In some embodiments, the data may further include a side-band communication data. The side-band communication data can be provided from the first device to the second device and from the second device to the first device via a single pin of the USB connector and via a single pin of the media connector at one of 2 Mbps, 5 Mbps, and 10 Mbps.

According to another example embodiment of the present disclosure, the steps of the method for selectively communicating data between a first device and a second device are stored on a non-transitory machine-readable medium comprising instructions, which when implemented using one or more processors perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

FIGS. 5A-5D show an example structure of data packages used to transfer data containing USB protocol data at different data transfer rates.

FIGS. 7A-7D illustrates example USB data payload structures respectively for 6.75 Gbps, 5.4 Gbps, 3.375 Gbps, and 2.7 Gbps link data transfer rates.

FIGS. 9-11 shows error correcting code (ECC) check bytes generation schemes for forward connections, according to various example embodiments.

FIG. 14 shows error correcting code (ECC) check bytes generation schemes for backward connections, according to various example embodiments.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter without undue experimentation. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The technologies disclosed herein provide isochronous transport services over a high-speed link and device management services over a C-wire link between a source device and a sink device.

According to various embodiments of the present disclosure, a method for selectively communicating data between a first device and a second device may include receiving a configuration data associated with the second device. Method may further include generating a selection signal based on the configuration data. Method may further include causing, based at least in part on the selection signal, the data to be selectively provided to the second device by the first device, the data including at least one of the following: Universal Serial Bus (USB) protocol data and uncompressed high definition media data.

Figure 1:
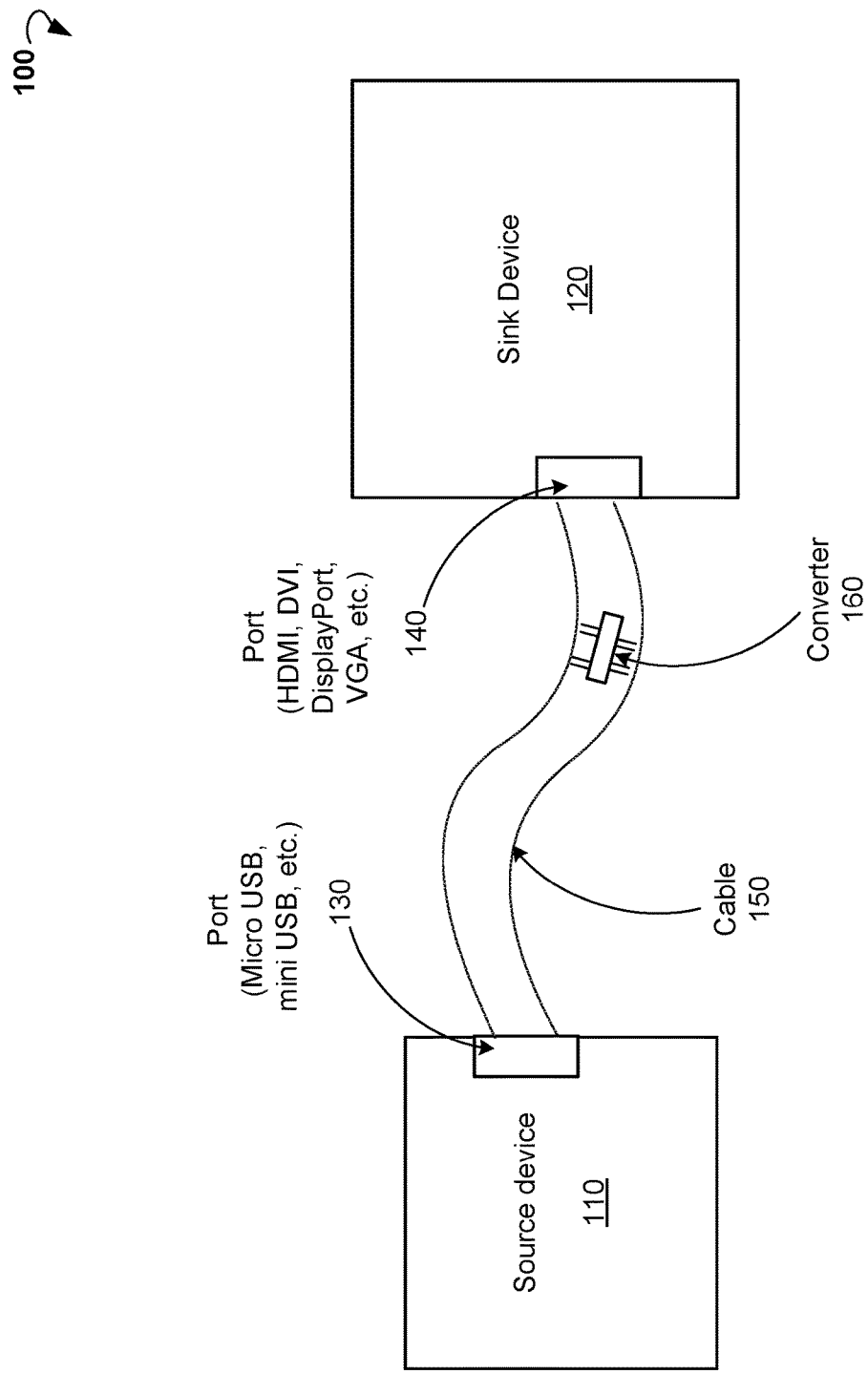
FIG. 1 is a block diagram of an environment wherein a method for selectively communicating data can be implemented, according to various example embodiments.

Referring now to the drawings, FIG. 1 is a block diagram of an environment 100 in which a method for selectively communicating data can be implemented, according to various example embodiments. The environment 100 can include a source device 110 and a sink device 120, a cable 150 with an embedded converter chip 160. The source device 110 can include a port 130 for providing data to sink device 120 via the cable 150 and converter chip 160. In various embodiments, the port 130 may include a 5-pin port, for example, a micro USB port, a mini USB port, and so forth. The provided data can include audio/video (AV) data, USB data, C-wire data, and the like. The sink device 120 can include a port 140 for receiving data from converter chip 160 via cable 150. In various embodiments, the port 140 may include a media connector, for example, an HDMI port, a DVI port, a VGA port, a DisplayPort, and the like.

Figure 2:
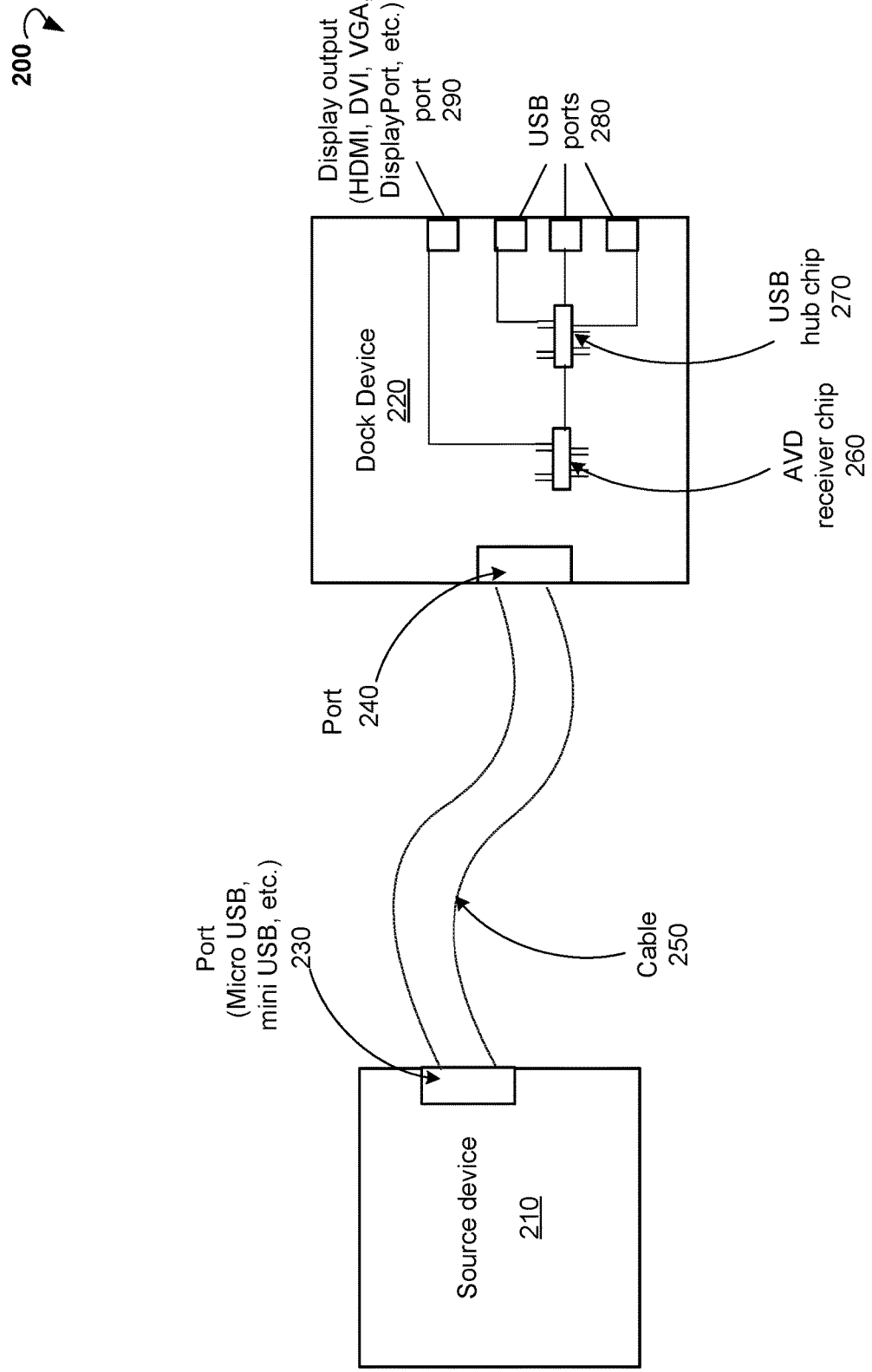
FIG. 2 is a block diagram of an environment wherein a method for selectively communicating data can be implemented, according to various example embodiments.

FIG. 2 is a block diagram of an environment 200 in which a method for selectively communicating data can be implemented, according to various example embodiments. The environment 200 can include a source device 210, a cable 250, and a doc device 220, also referred to herein as dock device 220. The source device 210, in the example in FIG. 2, can include a port 230 for providing data to dock device 220 via the cable 250. The provided data may include AV data (AVD), USB data, C-wire data, and the like. The dock device 220 includes a port 240 for receiving the data from the source device 210, in this example. The dock device 220 may further include an AVD receiver chip 260, a USB 2.0 hub chip 270, USB ports 280, and at least one display output port 290. In various embodiments, the display output port 290 can include an HDMI port, a DVI port, a DisplayPort, a VGA port and the like.

Figure 3:
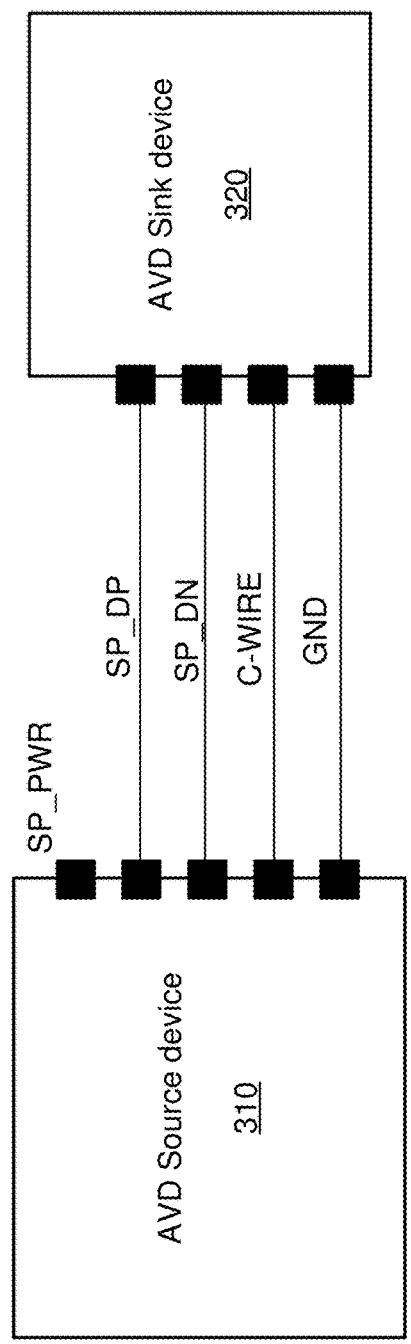
FIG. 3 is an example block diagram showing a signal connection between a source device and a sink device.

FIG. 3 is a block diagram showing a signal connection between a source device and a sink device, according to an example embodiment. The source device 310 may have 5 input/output pins labeled as SP_PWR, SP_DP, SP_DN, C-WIRE, and GND. The sink device 320 may have 4 input/output pins: SP_DP, SP_DN, C-WIRE, and GND. The example pin definitions may be found in Table 1.

TABLE 1

Pin definitions

| Pin Name | Description |
|---|---|
| SP_ PWR | By default, supplied by a source device and consumed by a downstream converter chip. Upon detecting that a cable adapter exist and is capable of generating SP_PWR from sink device, the source device may prompt the cable adapter to use the power from downstream devices (or externally) and configures itself as a SP_PWR consumer. |
| SP_ DP/DN | High speed differential signal pair. Uni-directional from source device to sink device. |
| C_WIRE | Single-wire communication channel between a source device (transmitter) and a sink device (receiver). |
| GND | Ground return signal. |

In various embodiments, the links between source device (FIG. 1-3) and sink device (FIGS. 1 and 3) or dock device (FIG. 2) may include the isochronous transport services over the high-speed link and device management services over the C-wire link. The data transferred on the high-speed link may be based on the micro-packet architecture.

Forward High-Speed Data Transfer Services

In various embodiments, a forward high-speed data transfer may be done on the main link, which may be represented by a high-speed differential pair SP_DP/DN. There may be two work modes depending on downstream device type. If the downstream device is a SlimPort 1.0 compliant sink device, then the data transfer may follow the SlimPort 1.0 protocol. If the downstream device is a Slimport AVD compliant sink device, then the data may be transferred on the high-speed link using a different format called micro-packet, also referred as μPacket TX.

Figure 4A:
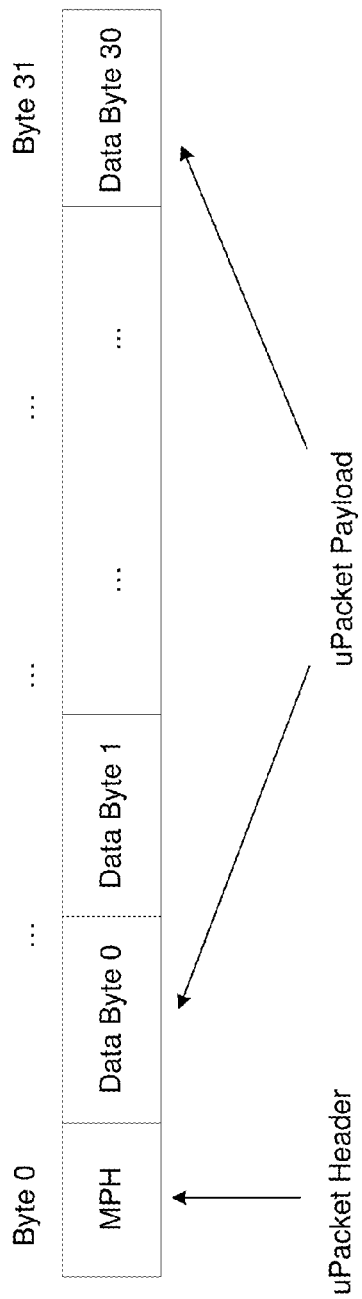
FIG. 4A shows an example structure of a data package for transferring data from a source device to a sink/docking device.

FIG. 4A is a block diagram showing an example structure of μPacket TX structure for transferring data from a source device to a sink/docking device, according to an example embodiment. The single μPacket TX (micro packet TX) may include a single header byte referred to as MPH and 31 data bytes. In various embodiments, the 31 data bytes may be further partitioned into 2 payload portions including the audio/video stream portion and the USB data stream portion.

Figure 4B:
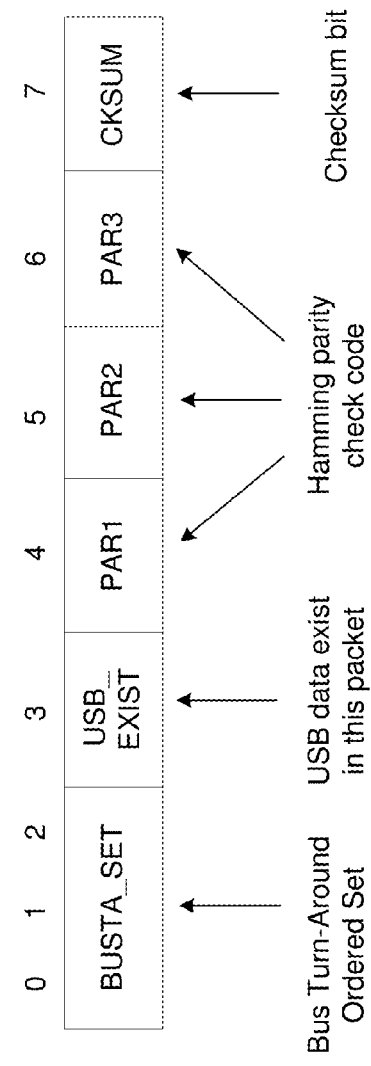
FIG. 4B shows example bit definitions of a header byte of a data package.

FIG. 4B shows bit definitions of a header byte of a data package (μPackage TX), according to an example embodiment. The μPacket TX header (MPH) byte may contain 4 data bits and 3 parity check bits and one checksum bit. Within the 4 data bits one link control symbol referred as BUSTA_SET may take three data bits and one data indication flag referred as USB_EXIST takes one data bit.

In some embodiments, the bus turn-around control ordered set (BUSTA_SET) may be defined as 'bit [0:2]: 011→111→110→100→000'. In order to send the bus turn-around command to the sink device the source device may send this ordered set in five consecutive μPacket TX packet headers. On the sink side, as long as it can receive three of the 5 symbols in the ordered set, it may then start a bus turn-around process right after receiving the last μ TX, which may contain the last symbol (000) of the ordered set independently on whether the Hamming or error correcting code (ECC) decoding result for the last header byte is correct or not.

In some embodiments, the USB_EXIST flag indicates if there is a USB stream data in the payload of μPacket TX or not. In an example embodiment, if this bit is asserted then there are some data bytes allocated as USB stream data in the current μPacket TX, otherwise all the payload are assigned as AV stream data (except for 2 bytes used for ECC).

Still referring to FIG. 4B, the PAR1, PAR2, PAR3 bits of the MPH byte are parity check bits for the prior 4 data bits and CKSUM is a checksum bit. In some embodiments, the 3 parity check bits may be generated by the Hamming code generator. The checksum bit may be further added so that the sum of all the bits is 0.

According to an example embodiment, the (7, 4) hamming code generator matrix G and the checker matrix H is listed below $$G := \begin{pmatrix} 1 & 0 & 0 & 0 & 1 & 1 & 0 \\ 0 & 1 & 0 & 0 & 1 & 0 & 1 \\ 0 & 0 & 1 & 0 & 0 & 1 & 1 \\ 0 & 0 & 0 & 1 & 1 & 1 & 1 \end{pmatrix}_{4,7}$$

and $$H := \begin{pmatrix} 1 & 1 & 0 & 1 & 1 & 0 & 0 \\ 1 & 0 & 1 & 1 & 0 & 1 & 0 \\ 0 & 1 & 1 & 1 & 0 & 0 & 1 \end{pmatrix}_{3,7}.$$

The data encoding may be calculated as C=I·G, where I is the 4-bit information data, G is the generator matrix as shown above and C is the final coded word. The decoding may be based on syndrome, which may be calculated as S=H·C', where H is the checker matrix as shown above, C' is the received code word and S is the 3-bit syndrome.

By way of example and not limitation, the error detection and correction matrix may be based on the exemplary calculated syndrome shown in Table 2 below.

TABLE 2

Exemplary Hamming decoder table based on calculated syndrome

| S | E'$_0$ | E'$_1$ | E'$_2$ | E'$_3$ | E'$_4$ | E'$_5$ | E'$_6$ |
|---|---|---|---|---|---|---|---|
| 000 | 0 | 0 | 0 | 0 | 0 | 0 | 0 |
| 001 | 0 | 0 | 0 | 0 | 0 | 0 | 1 |
| 010 | 0 | 0 | 0 | 0 | 0 | 1 | 0 |
| 011 | 0 | 0 | 1 | 0 | 0 | 0 | 0 |
| 100 | 0 | 0 | 0 | 0 | 1 | 0 | 0 |
| 101 | 0 | 1 | 0 | 0 | 0 | 0 | 0 |
| 110 | 1 | 0 | 0 | 0 | 0 | 0 | 0 |
| 111 | 0 | 0 | 0 | 1 | 0 | 0 | 0 |

The error corrected code word C may be calculated as C'+E'. For example, if the information word I is (1011), then the coded word C=I·G=(1011010). The decoder syndrome may be calculated as S=H·C=(000). Suppose there is one bit error happening during the transmission and the received code word C' becomes (1010010), then the syndrome becomes S'=H·C'=(111). Based on exemplary table 2, E' is (0001000) so the error corrected code word is (1010010)+ (0001000)=(1011010) which matches the original code word.

In some embodiments, while sending packages, every 1024th MPH is replaced with the SR (Scrambler Reset) symbol to reset the Linear Feedback Shift Register (LFSR) of the sink device so that the scrambler and descrambler keep synchronized. However, in other example embodiments, the SR symbol is not inserted in between the bus turn-around ordered set.

Figure 5C:
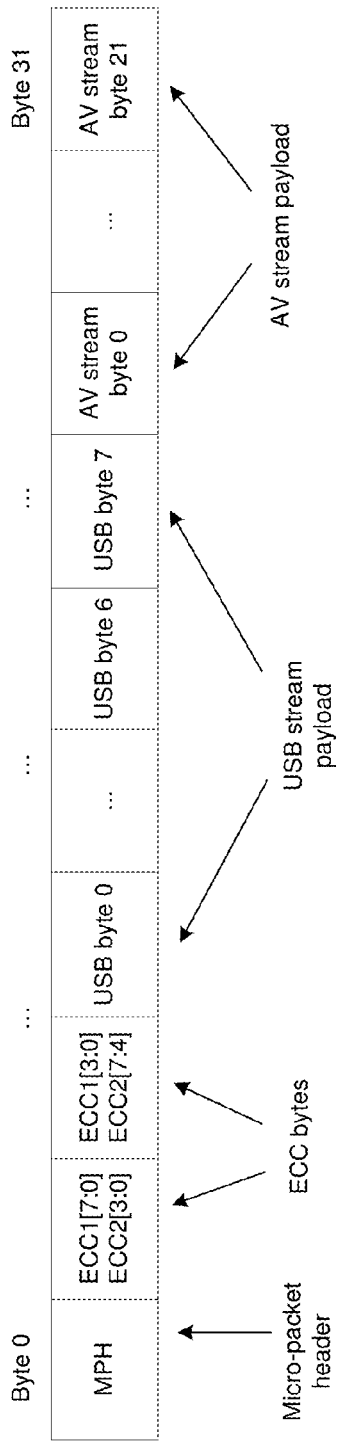
Figure 5D:
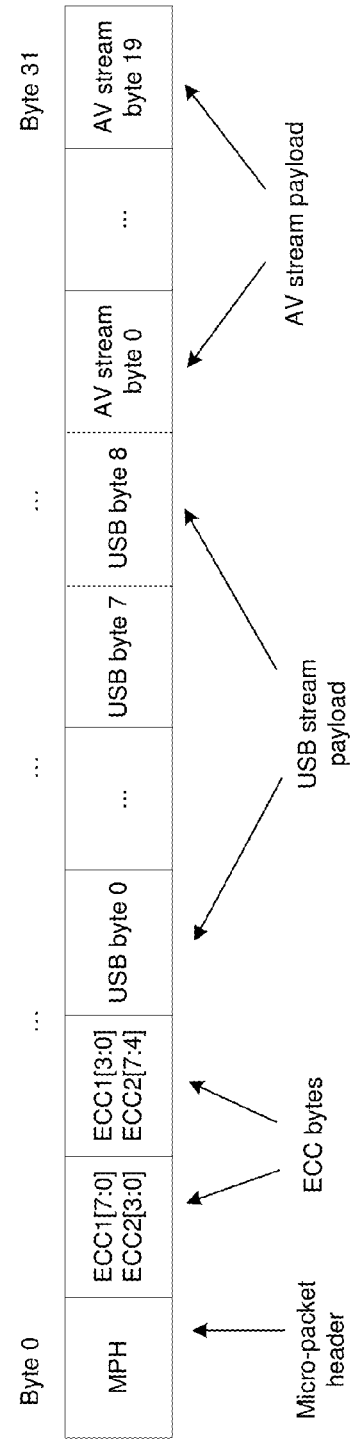

FIGS. 5A-5D show structure of data packages to transfer data containing USB protocol data at different data transfer rates in forward connections. USB_EXIST bit in the MPH byte of μPacket TX is asserted. FIG. 5A shows μPacket TX data structure for 6.75G link speed, FIG. 5B shows μPacket TX data structure for 5.4G link speed, FIG. 5C shows μPacket TX data structure for 3.375G link speed, and FIG. 5D shows μPacket TX data structure for 2.7G link speed.

The payload bytes allocation may be decided by the link bandwidth. The AV stream may take all the remaining spaces in the μPacket TX after MPH byte, USB data bytes and ECC byte(s). The payload allocation in number of bits for USB data based on different link bandwidth is shown in Table 3.

TABLE 3

Exemplary μPacket TX payload allocation for the USB stream

| Link speed | 6.75 Gbps | 5.4 Gbps | 3.375 Gbps | 2.7 Gbps |
|---|---|---|---|---|
| Valid USB data bits in one μPacket TX | 22/23 | 28/29 | 45/46 | 56/57 |

For example: for Link speed=5.4 Gbps, the average number of USB data bits in one μPacket TX can be calculated as: 0.48G*1.25/5.4G*32*8=28.44. Thus, within every 100 μPackets, there may be 44 μPackets which have the 28 valid USB data bits, the other 56 μPackets may have 29 valid USB data bits.

The USB data in the μPacket TX may be the recovered data after a NRZI (Non Return to Zero Invert) decoder. In some embodiments, the USB data does not go through either an elasticity buffer or an 6b7b Bit unstuffer.

Figure 6:
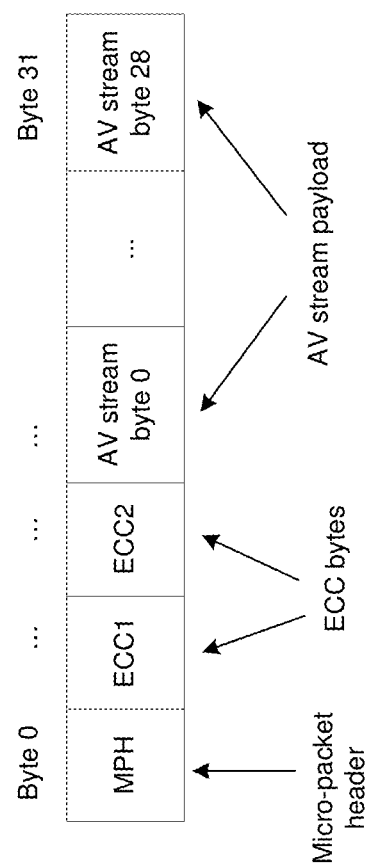
FIG. 6 shows a structure of a data package used to transfer data not containing USB protocol data, according to various example embodiments.

FIG. 6 shows a structure of a data package used to transfer data not containing USB protocol data, according to various example embodiments. For example, the USB_EXIST bit in the MPH byte of μPacket TX (in FIG. 4) is not asserted.

FIG. 7A-7D illustrates USB data payload structures respectively for 6.75 Gbps, 5.4 Gbps, 3.375 Gbps, and 2.7 Gbps link data transfer rates. The USB data, including the recovered SYNC bits, may be packed into the μPacket TX with bit-wise resolution, along with the squelch detection flag(s).

Figure 8:
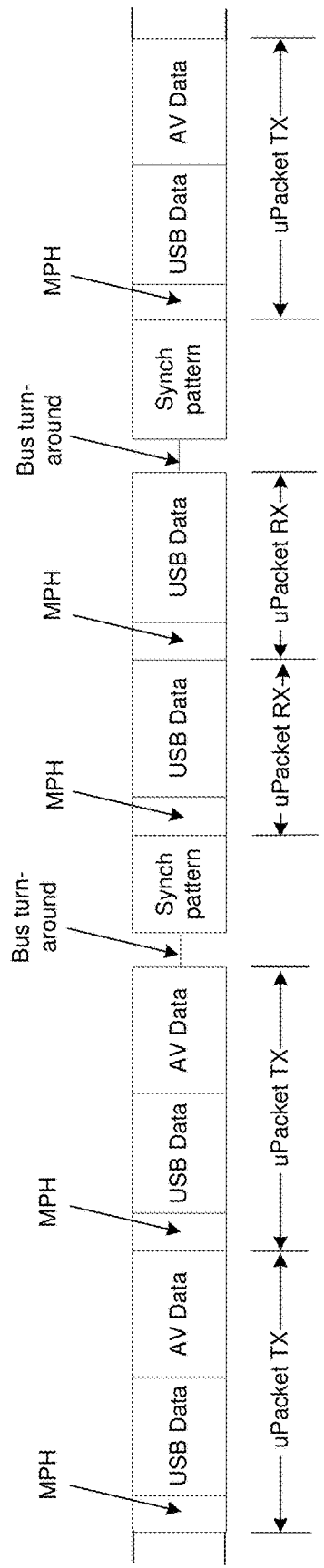
FIG. 8 shows a structure of a data stream between a source device and a docket device suitable for transferring USB data in forward and backward directions, according to an example embodiment.

FIG. 8 shows a structure of a data stream between a source device and a docket device suitable for transferring USB data in forward and backward directions, according to an example embodiment.

In some embodiments, the AV stream may be transferred in a burst mode. The burst mode may be such that, even when the link bandwidth is less than the active video stream bandwidth, it may be still possible to transfer the AV stream over the link without any loss (the active video stream may take up some horizontal blanking period in such case). The burst mode transfer may be performed by building a line buffer in both the source device and the sink device.

In other embodiments, the USB stream transfer may be real-time, which means the source device may transfer as much available USB data as possible to achieve good Quality of Service and reduce the latency.

ECC Check Bytes Generation in μPacket TX

In various embodiments of present disclosure, there may be several ECC check bytes generation schemes used in the μPacket TX depending on different situations. Reed-Solomon encoding may be applied to all these cases and each symbol may be a O-bit nibble.

The ECC1 and ECC2 bytes (4 nibbles) in μPacket shown FIG. 5A or 5B may be generated using (15, 11) Reed-Solomon encoder based on GF(24). The related generation polynomial may be: $G(x)=(x-\alpha_1)(x-\alpha_2)(x-\alpha_3)(x-\alpha_4)$. The MPH header byte and the USB bytes may be involved in the calculation. The coded word after the ECC bytes may be attached is shown in FIG. 9. Upper code word in FIG. 9 may be used for 6.75 Gbps link speed (μPacket TX shown in FIG. 5A) and lower code word in FIG. 9 may be used for 5.4 Gbps link speed (μPacket TX shown in FIG. 5B).

In some embodiments, the MPH byte may be protected twice through both a Reed-Solomon encoding and a Hamming encoding in order to overcome a bit-error spread issue caused by the 8b10b decoding. Upon receiving an μPacket TX, the sink device may first perform Hamming decoding to get BUSTR_SET and USB_EXIST signals and then perform Reed-Solomon decoding on the MPH byte to further verify.

In some embodiments, the ECC1 and ECC2 bytes in μPackets TX of FIG. 5C and FIG. 5D may be generated using the (15, 13) Reed-Solomon encoder. The ECC1 and ECC2 may be generated independently as shown in FIG. 10. The MPH byte and USB flag nibble may be included in both coded words to increase the chance to decode this important information in case there is error on the link.

In some embodiments, the ECC1 and ECC2 bytes in μPacket TX shown in FIG. 6 may be calculated using the (15, 11) Reed-Solomon encoder. The corresponding code word is shown in FIG. 11.

Backward Data Transfer Service

According to an example embodiment, in the backward direction, only USB data is transferred from the sink device to the source device. After the USB Host on the source side sends an IN Token, the source device may instruct bus turn-around on the high-speed link. After bus turn-around is successful, the sink device may send the USB data back to the source device. After the transaction is done, the sink device may perform bus turn-around again and make itself ready for forward data transfer. In each bus turn-around transaction, one USB packet may be transferred but no partial USB packet may be transferred.

USB Backward Transfer Data Structure

Figure 12:
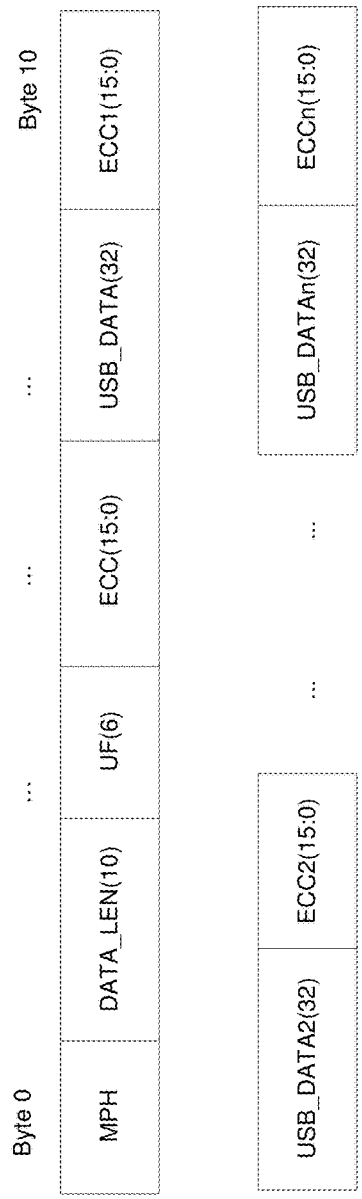
FIG. 12 shows an example structure of a data package for transferring USB data backwards from a sink device to a source device.

In various embodiments, the USB data transferred backward may be also represented in micro-packet format. FIG. 12 shows an example structure of a data package for transferring USB data backwards from a sink device to a source device. The data structure may, for example, be referred as μPacket RX. Each μPacket RX may have a variable length of at least 11 bytes. The μPacket RX packet may include one header byte (MPH), the DATA_LEN field containing length of the packet, user defined (UF) flags, and one or more USB data groups. In some embodiments, each USB data group includes 32 bit USB data and 2 bytes of ECC data. Each μPacket RX would normally carry at most 1024 USB data bits (after NRZI decoding but without unstuffing). In an exceptional case when the last data for the backward USB data transfer is transmitted, the μPacket RX may include only one byte (i.e. the header byte).

Figure 13:
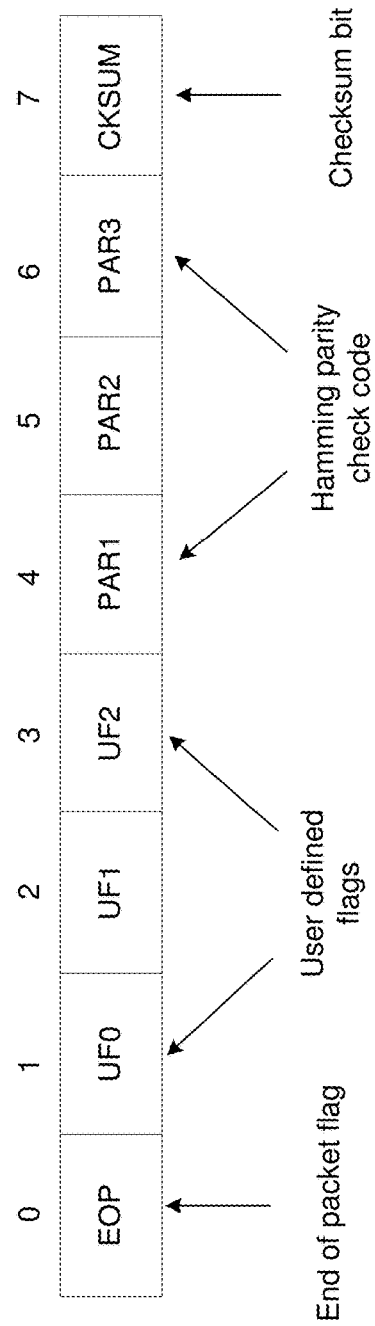
FIG. 13 shows example bit definitions of a header byte of a data package for backward connections.

FIG. 13 shows bit definitions of a header byte of a data package for backward connections, according to an example embodiment. The header byte of μPacket RX may include the end of a packet (EOP) flag, user defined flags UF0, UF1, and UF2, parity check bits PAR1, PAR2, PAR3 for the prior 4 data bits, and checksum bit CKSUM. The EOP flag is 1 when current packet is the last packet which would have USB data, and EOP flag is 0 when current packet is not the last packet which has the USB data. Three user-defined flags UF0, UF1, UF2 may be vendor specific. Parity check bits and the checksum bit may be generated using the same method as it was described for μPacket TX header byte.

By way of example and limitation, when the backward USB data transfer starts, the EOP bit may be set to '0' for every packet. When transferring the last packet which has valid USB data, the EOP bit may be set to '1'. Upon receiving the last packet, the sink device may send one shorted packet with the header byte only. In this header byte, EOP may keep as '1'. The reason for the one-byte packet transfer may be that in case the previous packet header is disturbed during the transfer and the EOP bit is misinterpreted as '0' instead of '1', the source device would still have chance to correct it after correctly receiving the one-byte shorted packet without causing any chaos in the system. As soon as the source device receives the correct one-byte shorted packet, it can prepared for bus turn-around.

In between USB backward data transfers, if the received EOP bit is '1' and the next packet with EOP set as '0' or the next packet is not shorted packet with EOP set at '1', the source device may ignore this mismatch and continue to receive the packets.

ECC Calculation for μPacket RX

FIG. 14 shows error correcting code (ECC) check bytes generation schemes for backward connections, according to various example embodiments. In some embodiments, the (15, 11) Reed-Solomon encoding may be applied for the data in the μPacket RX. Within each coded word, 2 symbol errors can be corrected. One symbol has 4 bits (one nibble). The MPH byte, DATA_LEN field and UF field may be encoded by 4-nibble ECC. In various embodiments, each USB data group has 4-nibble ECC data to encode the 32-bit USB data in this data group.

Backward Transfer Bandwidth Calculation

The backward data transfer occurs in response to a USB host on a source device side asking for an IN packet from downstream USB devices or the downstream USB devices acknowledges an OUT packet from the USB host device. The link bandwidth limits the bandwidth allocated to the backward transfers. The video format also affects the backward transfer bandwidth availability. For example, the relationship may be shown in below formula:

$$((B_v+B_u+B_H)/B_L*T_{line}+T_B) \leq T_{line}$$

Here $B_v$ is active video bandwidth, $B_u$ is the USB bandwidth (including native USB stream bandwidth and the related overhead such as 8B/10B, USB flags and ECC data), $B_L$ is link bandwidth, $B_H$ is µPacket TX header bandwidth (one byte for every µPacket TX packet), $T_{line}$ is video line time, and $T_B$ is time available for backward transfer within one video line time.

Example 1

The link bandwidth $B_L$ is 6.75 Gbps, video format is 1080p@60 hz, then $B_v$ is 3.88 Gbps, $B_u$ is 1.27 Gbps, $B_H$ is 0.21 Gbps, $T_{line}$ is 14.8 µs. Then $T_B$ can be calculated as ~3.2 µs from the above formula. If each backward transfer takes 1 µs then 3 backward transfers can take place in one video line time.

Example 2

The link bandwidth $B_L$ is 5.4 Gbps, video format is 1080p@60 hz, then $B_v$ is 3.88 Gbps, $B_u$ is 1.18 Gbps, $B_H$ is 0.17 Gbps, $T_{line}$ is 14.8 µs. Then $T_B$ can be calculated as 0.466 µs.

Example 3

The link bandwidth $B_L$ is 3.375 Gbps, video format is 720p@60 hz, then $B_v$ is 1.73 Gbps, $B_u$ is 1.16 Gbps, $B_H$ is 0.11 Gbps, $T_{line}$ is 23.1 us. Then $T_B$ can be calculated as 2.56 µs.

AV Stream Data Packing

Figure 15:
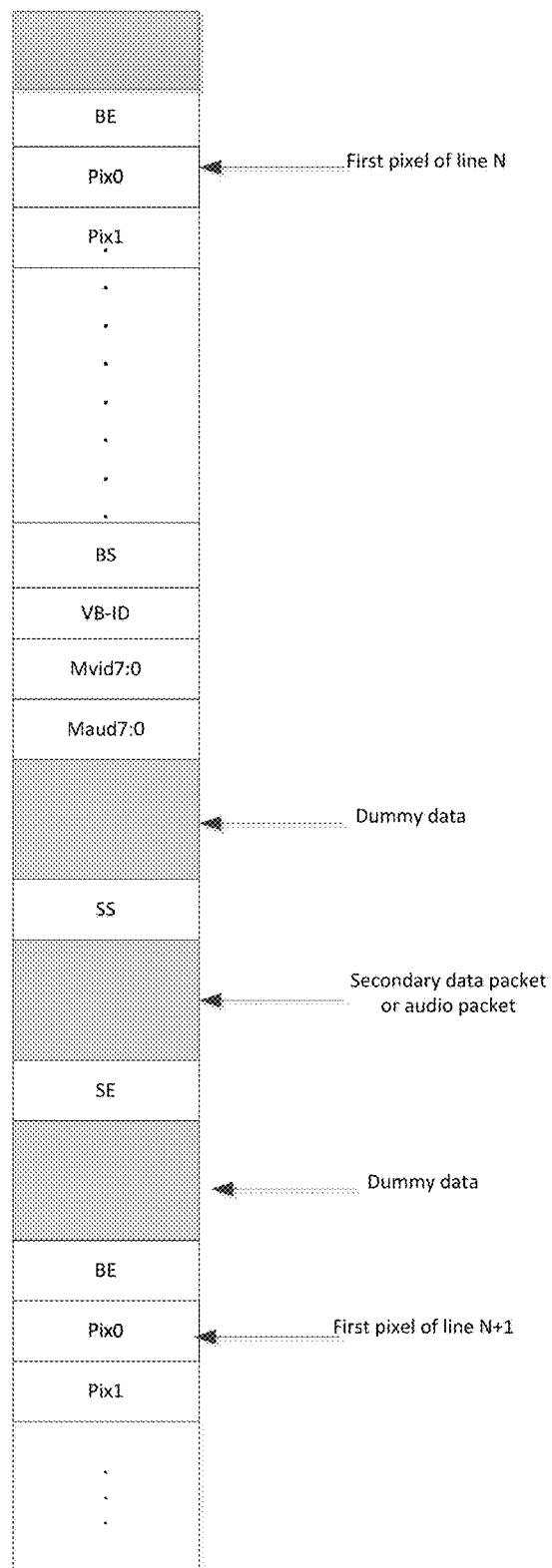
FIG. 15 shows an example audio/video stream data packing.

FIG. 15 shows an example audio/video (AV) stream data packing. The AV stream may be transferred from the source device to the sink device. In some embodiments, only uncompressed content may be transferred. In certain embodiments, the data packing method is the same as in DisplayPort 1.2 spec section 2.2, but for one-lane mode only.

The transfer unit (TU), as defined in DisplayPort standard specification, may not apply since the AV data may be transferred in burst mode on the high-speed link. The source device may be assumed to save one video line data and the corresponding audio data. The audio/video data may be inserted into the µPacket TX and sent out in burst mode. There may be two scenarios to consider:

1. The one line's data is transferred earlier than the new line's data is ready. It happens when the link effective bandwidth is higher than AV stream bandwidth. When this happens, dummy data may be inserted before the BE symbol to fulfill the extra bandwidth.

2. The one line's data transfer has not finished when the new line's data is ready. It happens when effective link bandwidth is less than the AV stream bandwidth, for example, when the bus turn-around happens. When the bus turn-around happens, the dummy data during the vertical blanking period may be dropped to catch up with the bandwidth. It may not affect the recovery of the display at the sink side though. In the extreme case where the current line's active pixel data hasn't been completely transferred before the new line is ready, the source device has to drop the remaining active pixels or lines to accommodate the new line's data.

With this scheme, the 'BE' symbol before each new line may be aligned in time with the incoming video frames. The sink device can use the received 'BE' symbol as the video timing reference point.

USB Stream Data Packing

Figure 16:
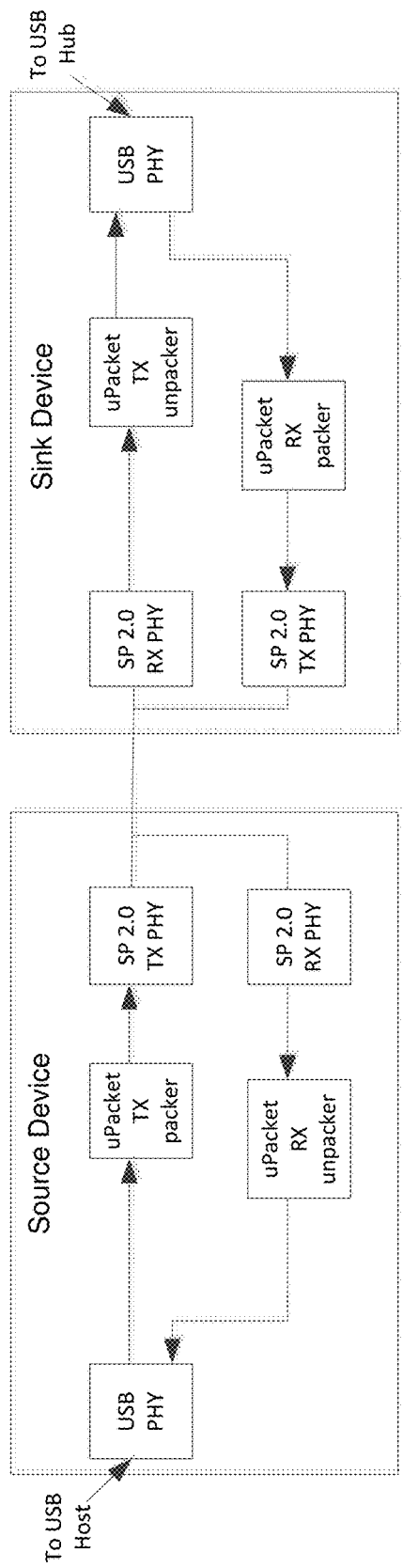
FIG. 16 is an example USB data path in a source device and a sink device.

FIG. 16 is a block diagram showing an example USB data path in a source device and a sink device. In various embodiments, the USB data transfer method used for forward direction may differ from the USB transfer method for the backward direction. In the forward direction, the USB data may be transferred in the isochronous mode, whereas in the backward direction the USB data may be transferred in the bulk mode.

While transferring USB data in the forward direction, a certain amount of bytes in µPacket TX may be allocated to the USB data based on the throughput matching. These entries would store the USB data, squelch toggling, and ECC bytes as shown in FIG. 5A-5D.

In the sink device, the USB data may be transferred back to the source device in whole packet during each transaction. The USB data packet has similar structure as in µPacket TX. The length of each packet varies depending on the packet type and content. The µPacket RX packet may fetch the recovered USB data from the reUSB packet buffer and pack them together with the ECC bytes into µPacket RX. The µPacket RX data structure is shown in FIG. 12.

A/V Stream Clock Recovery

The audio and video clock recovery in the Slimport AVD protocol may be the same as for recovery in the SlimPort 1.0 protocol, i.e., M and N values for the audio and video streams may be sent to the sink device and used to recover the audio and video clocks.

USB Data Clock Recovery

There may be no need to recover the USB clock in either the source device or the sink device since the USB data rate may be fixed at 480 Mbps and the 6b7b encoding ensures that the clock frequency difference between the host and slave side can be resolved by the elastic buffer in the USB physical layer (PHY). There may be a reference clock on both source and sink side to handle the USB traffic, in some embodiments.

HDCP Implementation in SlimPort AVD work mode

The high definition copy protocol (HDCP) authentication may be performed through the C-wire and the procedure may be the same as defined in the HDCP on DisplayPort Specification Rev 2.2. After the authentication is successful, the source device can replace the SR symbol with CPSR symbol to enable encryption. In μPacket TX every 1024th MPH may be replaced with the SR symbol to indicate the link frame boundary.

For the link integrity check, the two-byte LINK_VERIFICATION_PATTERN 0x531F may be transmitted on two consecutive MPH timeslots immediately following the SR symbol. These two bytes may be encrypted together with the payload data (AV stream data and USB stream data, without the ECC bytes). The sink device may decrypt these two bytes and compare them against the LINK_VERIFICATION_PATTERN. An error is determined to have occurred if the decrypted byte does not match the corresponding byte in the LINK_VERIFICATION_PATTERN. A link integrity failure may be determined to have occurred if pattern mismatches at the sink may be detected for two consecutive link frame periods (indicated by two SR symbols). Two consecutive link frame periods may be checked to enable recovery from simple transient synchronization errors (e.g. random bit error bursts). If a failure is detected within two consecutive link frames, the sink has experienced a non-recoverable loss cipher synchronization.

On detecting the unrecoverable loss of cipher synchronization, the HDCP receiver may assert the LINK_INTEGRITY_FAILURE bit in the RxStatus Display Port Configuration Data (DPCD) register and generate an interrupt. The HDCP transmitter may monitor the RxStatus register and if LINK_INTEGRITY_FAILURE is found the HDCP transmitter may disable HDCP Encryption at the SR boundary as soon as feasible and may initiate re-authentication with the transmission of a new AKE_Init message.

Since the content of the μPacket TX varies depending on the 'USB_EXIST' bit in the MPH byte, there may be certain rules to follow when replacing MPH with SR and LINK_VERIFICATION_PATTERN bytes, as follows.

1. The SR and LINK_VERIFICATION_PATTERN may not disturb the bus turn-around ordered set sequence which takes 5 MPH time slots.

2. When the MPH is replaced with SR or LINK_VERIFICATION_PATTERN, it may be assumed that the USB stream data exists in the μPacket TX payload. The reason of this assumption is that any available USB stream data can be sent out in a timely manner. If there is no USB data available to send, the transmitter can simply set SQE_POS to zero.

3. The MPH byte, except when replaced by SR symbol, may be 8B10B encoded together with other data bytes in the μPacket TX.

In various embodiments, the HDCP authentication and data encryption only applies to the forward direction AV stream data transfer. The backward USB data transfer may not require HDCP.

Link and Device Management Services

The link management services include the link plug/unplug detection, link initialization, HDCP authentication and link integrity check and high-speed link bus turn-around protocol. The device management service includes downstream device (USB slave or display sink devices) plug and unplug detection and downstream display device EDID read service.

C_Wire Link Speed Negotiation

The link management services may be performed through the C_wire link. (The C_wire link and C_wire (also referred to as C-wire) and certain other aspects are further described in U.S. patent application Ser. No. 13/365,624, filed Feb. 3, 2012 (U.S. Pat. No. 8,806,094, issued Aug. 12, 2014), U.S. patent application Ser. No. 13/461,761, filed May 1, 2012 (U.S. Pat. No. 8,799,537, issued Aug. 5, 2014), and U.S. patent application Ser. No. 14/456,941, filed Aug. 11, 2014 (U.S. Pat. No. 9,280,506, issued Mar. 8, 2016), which applications are commonly assigned and incorporated by reference herein.) In some embodiments, the C_wire on both source and sink devices may be working at 1 Mbps speed. The C_wire can be negotiated into higher speed depending on link quality. The negotiation process may be as follows:

1. The source device reads DPCD register 0050Eh bit 1:0, the C_wire speed capability.
2. The source device sets DPCD register 0050Eh bit 3:2 to set C_wire to desired speed.
3. The source device sends a special read command to DPCD address 0050Fh using the newly configured speed. If the sink device returns 0x5A then the speed negotiation is successful. The new speed may be applied for future C_wire communications until future negotiation is performed.
4. If there is no return from sink device, a NACK is returned or a wrong value is returned, then the speed negotiation may be not successful. The source device may reset sink C_wire speed setting to default value (1 Mbps) or a lower speed value and perform another round of negotiation.

The C_wire link speed negotiation may be performed when the sink device plug is detected or when the sink device has been reset and when the C_wire is not at default speed.

High-Speed Link Plug/Unplug Detection

The audio/video data high-speed link plug/unplug detection scheme may be backward compatible with SlimPort 1.0 specification, i.e., it may detect the voltage level on the 'ID' pin of the micro-USB connection. (The 'ID' pin (e.g., the device type indication) and aspects of the SlimPort 1.0 specification are also described in U.S. patent application Ser. No. 14/456,941, filed Aug. 11, 2014 (U.S. Pat. No. 9,280,506, issued Mar. 8, 2016), which application is commonly assigned and incorporated by reference herein.) However it may further check the downstream device is SlimPort 1.0 sink or Slimport AVD sink by reading the related DPCD registers. The link plug detection may be done in following steps:

1. The Slimport AVD source device periodically checks the voltage level of the ID pin.
2. If the ID pin falls into the SlimPort 1.0 plug detection range, then move to step 4.
3. If the ID pin falls beyond the SlimPort 1.0 plug detection range, Slimport AVD source device goes back to sleep mode and wait to check again.
4. The Slimport AVD source device read the DPCD capability register 0050Ch through C-wire. If the capability register shows the downstream link is Slimport AVD (protocol) capable, then move ahead with Slimport AVD related protocols, otherwise the downstream link is SlimPort 1.0 (protocol) capable.

When the link is detected and established after initialization process, the source device may periodically poll the link through the DPCD register read. Once the DPCD register read get no response and the voltage level of ID pin falls beyond the range, the source device may decide the link is unplugged and move itself to sleep mode. The link unplug detection may be performed as described below:

1. The Slimport AVD source device reads the DPCD register periodically
2. If the DPCD register read gets no response, further check the voltage level on the ID pin.
3. If the voltage level falls beyond the SlimPort link detection range, then the source device reports the link unplug event to the upper level and shuts down the high-speed link. The upper level may decide to put the Slimport AVD source device into sleep mode to save power.
4. If the voltage level is still within the SlimPort link detection range, the source device may report such abnormal status to the upper level and wait for further instruction. The upper level may reset the downstream sink device through a reset command or just shut down the link.

Link Initialization

After the downstream sink device plug is detected, the source device may perform the link initialization in order to prepare the high-speed link for AV and USB data stream transfer. The link initialization does forward and backward direction link training.

Link Authentication and Video Stream Encryption

Link authentication is optional after the link initialization has finished. If the transferred video content needs Digital Rights Management (DRM), the source device may start the HDCP authentication. The HDCP authentication process follows the HDCP 1.3 spec. The HDCP authentication may be performed on the Slimport AVD high-speed link as well as the downstream display sink devices connected with the Slimport AVD sink device. Once the HDCP authentication is successful, the data encryption may be performed. The encryption only applies to both the AV stream data and the USB data stream together with LINK_VERIFICATION_PATTERN in the µPacket TX. Backward USB data transfer would not require HDCP authentication or encryption, according to various embodiments.

When the high-speed link bus turn-around event happens, the HDCP encryption may pause and the LFSR may freeze as well. After the backward USB data transfer is finished and the link resumes to the forward direction, the HDCP encryption may resume at the next valid AV steam data.

High-Speed Link Bus Turn-Around

High-speed link turn-around happens when the SlimPort AVD source device is expecting USB data transfer from the downstream USB slave devices, e.g., a mouse click or movement, keyboard typing or USB storage device read, etc. In order to ensure the Quality of Service (QoS), the USB host device may enable USB data transfer from USB slave devices whenever there is data available. The Slimport AVD source device may be able to detect such USB data backward transfer requests and once detected, may start the bus turn-around protocol and USB backward transfer.

Downstream Device Plug/Unplug Detection

In various embodiments, the downstream device herein refers to the display sink device and/or the USB slave device connected to the Slimport AVD sink device on the downstream link. It is assumed that the Slimport AVD sink device may be followed by a USB hub device on the USB port, while the display sink device can directly connect to the display output (VGA, HDMI or DisplayPort) of the Slimport AVD sink device.

When a downstream USB slave device plug/unplug is detected, the USB hub device may generate the related signal per the USB 2.0 standard and send it to upstream USB port on the sink device, e.g., the Slimport AVD sink device. The Slimport AVD sink device may set the related DPCD register bit and wait for the next time this register bit is polled by the Slimport AVD source device.

In response to the display sink device plug/unplug being detected, the Slimport AVD sink device may set another DPCD register bit to indicate this event.

Downstream Device EDID Read

In response to a display sink device being plugged and detected, the Slimport AVD source device may perform the EDID read in order to set the appropriate output video format. The EDID read follows the same protocol defined in the DisplayPort standard.

Downstream Link Reset Command

The Slimport AVD source device may issue a downstream link reset command at any time of the data transfer. This usually happens when the source device detects abnormal behavior of the sink device and wants to reset the sink device to a known state. The downstream link transmits the reset command through the C-wire. After acknowledging the reset command, the sink device may enter the reset state. The behavior of the sink device after reset may be implementation specific, but the sink device may put its PHY in forward direction receiving mode and be able to process follow-up C-wire transactions.

DPCD Registers to Support Slimport AVD Link and Device Management

The Display Port Configuration Data (DPCD) registers to support Slimport AVD link and device management may be as listed in Table 4 below.

TABLE 4

Exemplary DPCD registers to support Slimport AVD link and device management

| DPCD Address | Definition | Read/Write |
|---|---|---|
| SlimPort capability and mode selection | | |
| 0050Ch | Bit 1:0 = SlimPort revision support<br>00: SlimPort 1.0 support<br>01: Slimport AVD support<br>Others: RESERVED<br>Bit 6:2 = Reserved | Read Only |
| 0050Dh | Bit 0 = SlimPort mode selection<br>0: SlimPort 1.0 mode (default mode)<br>1: SlimPort AVD mode<br>Bit 7:1 = Reserved | Read/Write |
| C-wire speed selection | | |
| 0050Eh | Bit 1:0 = C-wire speed capability<br>00: 1 Mbps<br>01: 2 Mbps<br>10: 5 Mbps<br>11: 10 Mbps | Read Only |
| | Bit 3:2 = C-wire speed selection<br>00: 1 Mbps (default mode)<br>01: 2 Mbps | Read/Write |

TABLE 4-continued

Exemplary DPCD registers to support Slimport AVD link and device management

| DPCD Address | Definition | Read/Write |
|---|---|---|
| | 10: 5 Mbps<br>11: 10 Mbps<br>Bit 7:4 = RESERVED | |
| 0050Fh | C_wire speed negotiation access register<br>Bit 7:0 = 0x5A | Read Only |
| | *Vendor specific interrupts* | |
| 00510h | VENDOR_SPECIFIC_INTERRUPT<br>Bit 0 = Downstream HPD is changed from 0 to 1.<br>Bit 1 = Downstream HPD is changed from 1 to 0.<br>Bit 2 = Link is down.<br>Bit 3 = Downstream HDCP is done.<br>Bit 4 = Downstream HDCP is fail.<br>Bit 5 = Downstream HDCP link integrity check fail.<br>Bit 6 = Received CEC command ready.<br>Bit 7 = CEC command transfer done. | Write clear (Write 1 to each to clear the corresponding interrupt.) |
| 00511h | VENDOR_SPECIFIC_INTERRUPT<br>Bit 0 = CEC TX Error.<br>Bit 1 = CEC TX No ACK.<br>Bit 2 = Downstream HDMI sink termination resistor is detected.<br>Bit 3 = Downstream 2.1 V power is ready.<br>Bit 4 = Downstream 5 V power is ready.<br>Bit 5 = Downstream power status change.<br>Bit 6 = Downstream USB device plugged<br>Bit 7 = Downstream USB device unplugged | Write clear (Write 1 to clear the corresponding interrupt.) |
| 00512h | VENDOR_SPECIFIC_INTERRUPT<br>Bit 0 = Bus turn-around error. Asserted when the sink side RX PHY cannot re-establish the CRD lock within T6 time after the backward USB data transfer finishes and the bus changes back to the forward direction<br>Bit 2:1 = received USB data ECC error<br>When the forward link speed is 5.4 Gbps or 6.75 Gbps Bit 1 is ECC error flag, Bit 2 is not used;<br>When the forward link speed is 2.7 Gbps Bit 1 is ECC1 and Bit 2 is ECC2.<br>Bit 7:3 = TBD | Write clear |
| | *Forward link training control* | |
| 00513h | FORWARD_LT_CTL<br>Bit 0 = Turbo mode enable<br>0: turbo mode disable. Link speed may be decided by DPCD register address 00100h.<br>1: turbo mode enable. Link speed is 6.75 Gbps<br>Bit 7:1 = RESERVED | Read/Write |
| | *Backward link training control* | |
| 00514h | BACK_LT_CTL<br>Bit 0 = backward link training enable<br>0: enable link training<br>1: disable link training<br>Bit 1 = backward link speed control<br>0: 2.7 Gbps<br>1: 3.375 Gbps<br>Bit 3:2 = backward transfer pre-emphasis control<br>Bit 7:4 = RESERVED | Read/Write |
| | *Sink device control* | |
| 00515h | Sink device control<br>Bit 0 = hardware reset. When this bit is asserted, the sink device may be reset, all the internal memory may be cleared, all the registers may be put to their default values.<br>Bit 1 = software reset. When this bit is asserted, the sink device may reset its hardware circuit. The internal memory and registers won't be reset. | Read/Write, Self clear. |
| | Bit 2 = bus turn-around stop. When this bit is asserted, the SlimPort sink device may stop the current bus turn-around process or USB backward transfer process and put its link into forward transfer mode. A link initialization process would normally be required following this operation. | |
| | *USB port state/control* | |
| 00520h~ 00521h | Downstream USB related state signals generated from the Sink device. Implementation specific. | Read only |
| 00522h~ 00523h | Upstream USB related control signals generated from the Sink device. Implementation specific. | Read only |
| 00524h~ 00525h | Upstream USB related state signals generated from the Source device. Implementation specific. | Read/Write |
| 00526h~ 00527h | Downstream USB related control signals generated from the Source device. Implementation specific. | Read/Write |

Slimport AVD PHY Layer

The Slimport AVD PHY may include a main link SP_DP/SP_DN high-speed differential pair for data transfer and C_wire which handles side-band communications between source device and sink device. The features may include:

1. The main link forward direction speed may be 2.7 Gbps, 5.4 Gbps or 6.75 Gbps.
2. The main link backward direction speed may be 2.7 Gbps or 3.375 Gbps.
3. The main link works in bi-directional mode, i.e. in forward or backward direction based on in-band command embedded in the data stream.

Figure 17:
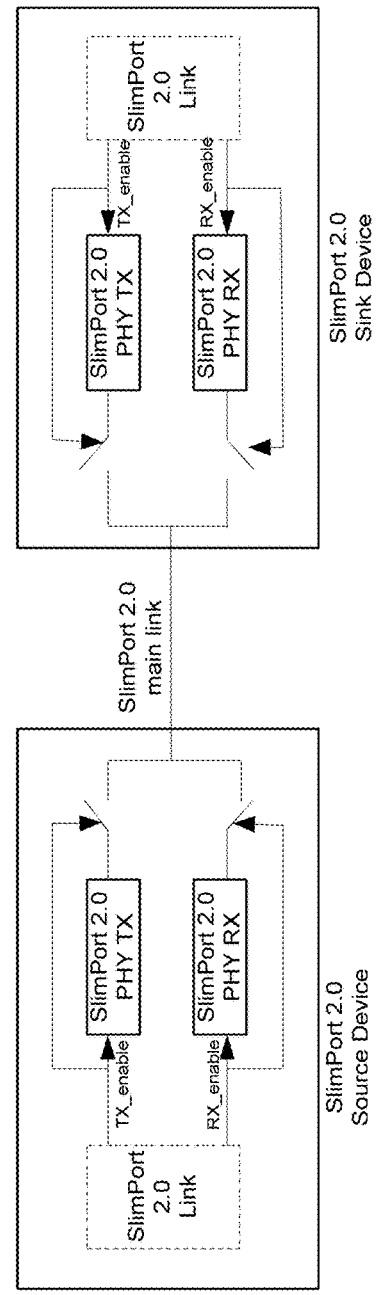
FIG. 17 is a Slimport AVD PHY connection between a source device and a sink device.

Within the PHY there may be two sub-blocks, i.e., the TX sub-block and the RX sub-block. These two blocks may be identical in both the source device and the sink device. The Slimport AVD PHY connection between the source and the sink device is shown in FIG. 17.

Slimport AVD PHY Work Mode

Link Initialization

Figure 18:
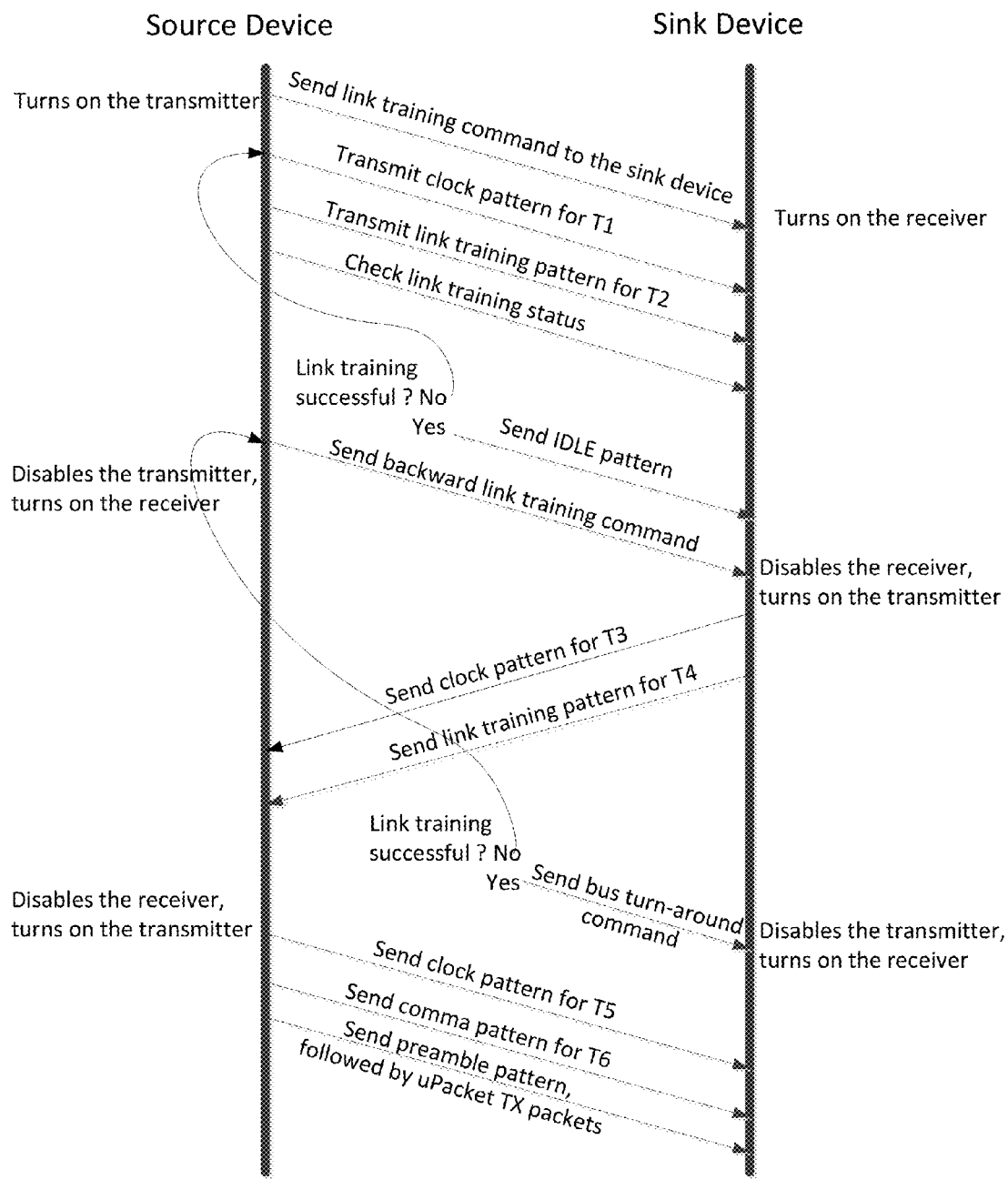
FIG. 18 is an example Slimport AVD Link Initialization Process.

FIG. 18 is an example Slimport AVD Link Initialization Process. When the Slimport AVD source device detects the Slimport AVD sink device plug, it may start the link initialization process. This process includes link training on the forward direction followed by link training on the backward direction. In various embodiments, the purpose of this link training is to prepare the TX and RX PHY on both source and sink devices for data transmission. The forward direction link training may be performed first. After it is successful, the source device informs sink device to do the reverse direction link training. This process may be described as following:

Exemplary Forward Direction Link Training

1. Source device sends link training command to the sink device through C-wire
2. Source device sends clock pattern for T1 time.

3. Source device sends link training pattern for T2 time.
4. Source device read link training status through C-wire. Once 'link training done' is detected, the source device starts to send IDLE pattern. Otherwise, the source device either increase the swing level or change the pre-emphasis setting and do the link training again described in step 2 and 3.
5. If after 5 iterations link training still cannot be achieved, the source device would downgrade the link speed and re-do the link training again.
6. If training failed for all the possible link speed, the source device would report link training failure to the upper level.

Exemplary Backward Direction Link Training

1. After forward direction link training is successful, the source device informs sink device to start backward link training through C-wire command, after the command is recognized the source device disables its transmitter and turns on its receiver
2. After receiving the command and sending back the acknowledgement the sink device disables its receiver and turns on its transmitter (*)
3. The transmitter in the sink device starts to send the clock pattern for T3 time, followed by the link training pattern for T4 time.
4. If link training is successful, the source device may send a C-wire command to inform the sink device to disable its transmitter and enable its receiver. After this command is sent and acknowledged by the sink device, the source device may disable its receiver and enable its transmitter
5. The sink device turns off its transmitter after the acknowledgement is sent back to the source device(*) and turns on its receiver.
6. The transmitter on the source side starts to send clock pattern for T5 time and then Comma pattern for T6 time. After Comma pattern is sent the transmitter would send the Preamble pattern followed by μPacket TX packets.
7. If link training is not successful, the source device would inform the sink device to start the link training again with lowered link speed or with higher pre-emphasis setting, until the link training is done.
8. If the link training cannot complete even with the lowest link speed, the source device would send the error message to the upper layer and then execute the actions in step 4 above.

*: The implementation may guarantee the active transmitter on the source/sink side turns off before the transmitter on the other side turns on in order to maintain the common mode voltages on both sides of the AC coupling cap almost unchanged during the bus turn-around.

In various embodiments, after both forward and backward link training is successful, the receivers on both sides keep the key parameters so that a fast lock can be achieved when the bus turn-around event happens.

Figure 19:
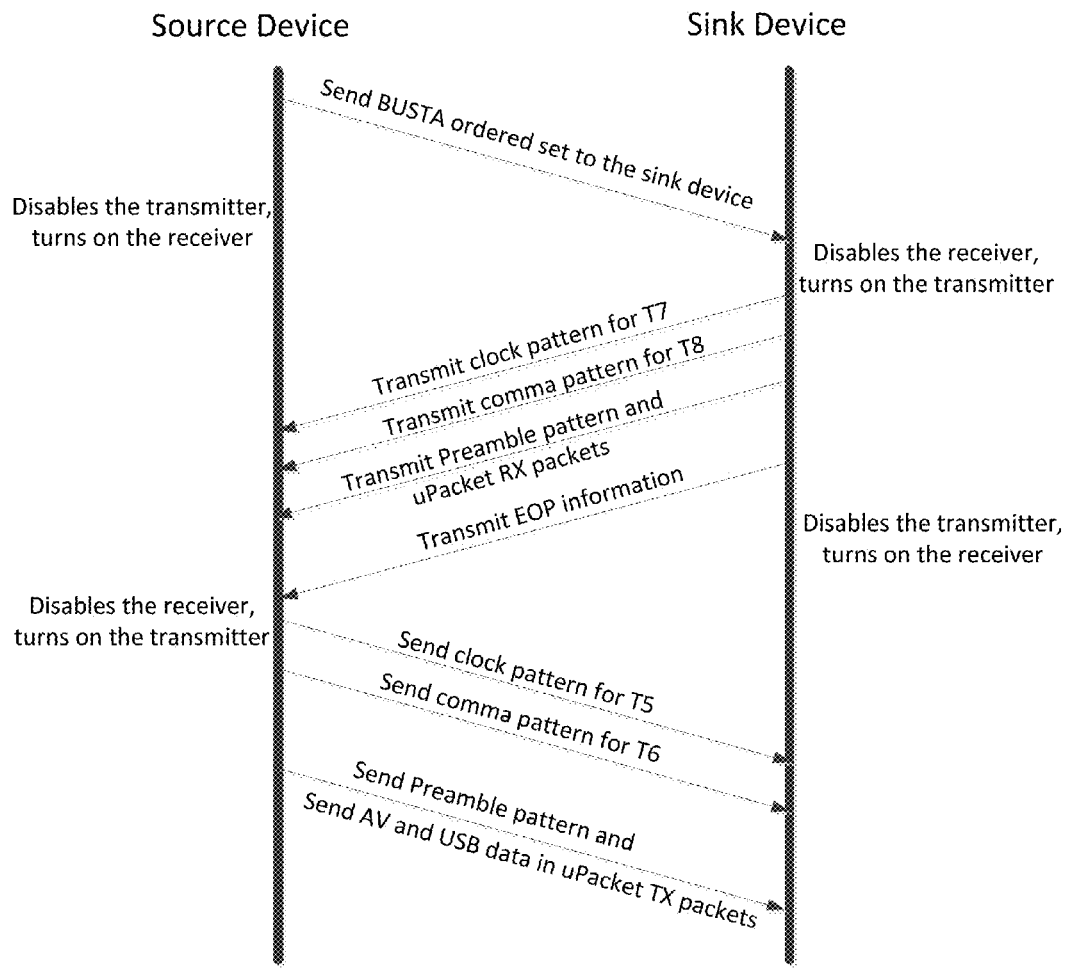
FIG. 19 is an example Slimport AVD Bus Turn-around Process.

In order to maintain backward compatibility, the forward link training process may be the same as in the MyDP 1.0 spec Main Link Bus Turn-Around and USB Data Backward Transfer FIG. 19 is an example Slimport AVD Bus Turn-around Process.

The main link bus turn-around happens when there is USB data from the downstream USB devices waiting to be transferred to the upstream USB port. Since USB protocol may be a master-slave mode, the USB host on the upstream would be expecting downstream USB data after an IN token is sent, so it may initiate the main link bus turn-around and backward USB data transfer and after the transfer is finished, turn the bus around again for forward AV/data transfer. The steps may be as described below:

1. Source device informs sink device to start bus turn-around by the BUSTA ordered set in the μPacket TX header byte, after this ordered set (5 packets) is transmitted the source device disables its transmitter and turns on its receiver
2. After receiving the BUSTA ordered set, the sink device disable its receiver, then turns on its transmitter.
3. The transmitter in the sink device starts to send the clock pattern for T7 time, then the comma pattern for T8 time, followed by the Preamble pattern and the μPacket RX data.
4. The receiver in the source device may achieve CDR lock and byte alignment within (T7+T8) time, otherwise, it may send an error message to the upper layer.
5. After the USB data transfer is done, the sink device sends the end-of-packet information in μPacket RX header through the VALID bit and EOP bit.
6. The transmitter in the sink device may be disabled and the receiver may be enabled.
7. At the same time the receiver in the source device may be disabled and the transmitter in the source device may be enabled and start to send the clock pattern for T5 time, followed by the comma pattern for T6 time.
8. After T6 time, the transmitter in the source device sends the Preamble pattern and then starts to send AV and USB data stream in μPacket TX format.
9. If within (T5+T6) time the receiver in the sink device cannot achieve lock, the 'bus turn around error' bit in the DPCD register (00512h bit 0) may be set and may be sampled by the source device some time later and the source device may inform the upper layer about this situation.

The source device may time out the transaction if the bus turn-around process exceeds 2 μs. The timer starts when the BUSTA bit is transmitted out and may reset itself once the transaction finishes. When the timeout happens, the source device can send the 'bus turn-around stop' command (to stop the bus turn-around and put the link back to the forward direction) or the source device can send a 'reset' command to reset the sink device.

Symbols and Patterns Definitions During Link Initialization and Bus Turn Around

Table 5 defines the symbols used in this spec. Table 6 defines the patterns used in the link initialization and bus turn around. Table 7 defines the related timing parameters.

TABLE 5

Exemplary Symbol definitions

| Symbol Name | Description | K code |
|---|---|---|
| SR | Scrambler Reset | K28.0 |
| CPSR | HDCP encryption enable symbol | K28.3 |
| BS | Blanking Start | K28.5 |
| BE | Blanking End | K27.7 |
| SS | Secondary data Start | K28.2 |
| SE | Secondary data End | K29.7 |

TABLE 6

Exemplary Pattern definitions

| Pattern type | Description | Usage |
| --- | --- | --- |
| Clock pattern | D10.2 pattern without scrambling | For link training |
| Link training pattern | K28.5−, D11.6, K28.5+, D11.6, D10.2, D10.2, D10.2, D10.2, D10.2, D10.2 without scrambling | For link training |
| Comma pattern | 8 symbols pattern: K28.5, D10.2, D10.2, D10.2, D21.5, D21.5, D21.5, D21.5 without scrambling | For byte alignment |
| Preamble pattern | 8 symbols pattern: SR, D24.7, D24.7, D24.7, D24.7, D24.7, D24.7, D24.7 without scrambling | It is the last eight bytes before the µPacket TX packets data. The scrambler reset symbol may reset the LFSR of the receiver side. |
| IDLE pattern | BS symbol followed by VB-ID with its NoVideoStream_Flag set to 1 followed by 'zero' data symbols. Total pattern length may be 8,192 link symbols. Every 512th BS symbol may be replaced by SR symbol. | Applied during link initialization. Sent by the transmitter in the source device after forward link training is done. |

TABLE 7

Exemplary link initialization and bus turn-around related timer values

| Timer | Min | Typical | Max |
| --- | --- | --- | --- |
| T1 | 100 us | | 500 us |
| T2 | 100 us | | 500 us |
| T3 | 100 us | | 500 us |
| T4 | 100 us | | 500 us |
| T5 | 100 ns | | 500 ns |
| T6 | 100 ns | | 500 ns |
| T7 | 100 ns | | 500 ns |
| T8 | 100 ns | | 500 ns |

Interoperability Between SlimPort 1.0 and SlimPort AVD Devices

The SlimPort AVD spec may be backward compatible with SlimPort 1.0 spec. The interoperability between SlimPort 1.0 and SlimPort AVD devices is described in further detail below.

SlimPort 1.0 Source Connect with SlimPort 1.0 Sink

By default, the SlimPort 1.0 source device may assume the sink device may be SlimPort 1.0 sink once the SlimPort cable is detected, so the SlimPort 1.0 source device may naturally work with SlimPort 1.0 sink device.

SlimPort 1.0 Source Connect with SlimPort AVD Sink

When a SlimPort AVD sink device is connected with SlimPort 1.0 source device, since the SlimPort AVD sink may work at SlimPort 1.0 mode by default (decided by DPCD register 0050Dh bit 0), they may work all-together at SlimPort 1.0 mode.

SlimPort AVD Source Connect with SlimPort 1.0 Sink

When a SlimPort AVD source device detects the SlimPort cable is plugged, the SlimPort AVD source device may read the SlimPort capability (DPCD register 0050Ch bit 1:0). If the downstream is SlimPort 1.0 sink device, it may reply 00 which means the sink device only support SlimPort 1.0 mode. The SlimPort AVD source device may set itself work at SlimPort 1.0 mode.

SlimPort AVD Source Connect with SlimPort AVD Sink

When a SlimPort AVD sink device is connected with the SlimPort AVD source device, the returned value of the SlimPort capability may be 01 which indicates the sink device is SlimPort AVD sink. The SlimPort AVD source device can decide to set the link at SlimPort 1.0 mode or SlimPort AVD mode by setting the SlimPort mode selection register in the SlimPort AVD sink device.

Scrambling

The same scrambling mechanism as defined in the DisplayPort 1.2a standard may be applied. The scrambler and descrambler only apply to the forward direction data transfer. No scrambling is applied for the backward direction transfer. The scrambler scrambles the transmit data in the source device and the descrambler recovers the data in the sink device. When the Scrambler Reset (SR) symbol (per the standard) is received (i.e., in response to the SR symbol being received), the sink device may reset the Linear Feedback Shift Register (LFSR) to FFFFh. The SR symbol is sent every 1024 µPacket TX packets. The scrambling LFSR polynomial may be:

$$G(X) = X^{16} + X^5 + X^4 + X^3 + 1$$

The scrambling may have the following rules in some embodiments:
1. The LFSR advances on all symbols, both data symbols (D) and special symbols (K).
2. Special symbols (K) are not scrambled.
3. Data symbols are scrambled.

8B10B Encoding/Decoding

The 8B10B encoding and decoding may be the same as defined in ANSI X3.230-1994, clause 11 and used in the DisplayPort specification. The 8B10B encoding is applied to both forward and backward data transfer. When the encoding starts, the initial running disparity may be minus (−). When the bus turn-around event happens, the running disparity of the source side encoder may be saved and used when the bus turn-around event has finished and forward transfer resumes. The running disparity of the sink side encoder may always start from 'minus' state when a new USB backward transfer begins.

When an 8B/10B decoding error happens to the video stream, the error handling may follow the DisplayPort standard, i.e., the sink device may record the 8B/10B decoding error count, but will not correct the erroneous data in either way.

When an 8B/10B decoding error happens to the USB data stream, the receiver may set the 'RX_ERROR' bit which corresponds to the erroneous data byte to '1' and pass it to the USB PHY interface at the upstream facing port or the downstream facing port depending on the USB data transfer direction.

Spread-Spectrum Clocking

Spread-spectrum clocking (SSC) may be applied to both forward and backward direction data transfer to minimize the EMI impact. The SSC has the same amplitude and frequency as defined in the DisplayPort specification.

In order to speed up CDR lock during bus turn-around, it may be very desirable for the PLL on the receiver side to track the SSC profile of the PLL on the transmitter side. Tracking of the SSC profile may be implementation specific, e.g., one of the embodiments uses Global $T_{line}$ Code (GTC) to keep the GTC values of both transmitter side and receiver side in sync and uses the GTC counter to drive the SSC waveform. The description and implementation of GTC may be as in DisplayPort 1.2a specification section 2.13.

High-Speed Link Electrical

The high-speed link works in bi-directional mode. In the forward direction, there may be three link speed modes, i.e., 2.7 Gbps, 5.4 Gbps and 6.75 Gbps. In the backward direction, there may be two link speed options, i.e., 2.7 Gbps and 3.375 Gbps. The 2.7 Gbps and 5.4 Gbps modes have the same electrical specification spec as defined in DisplayPort 1.2 specification. The other link speed modes may have the AC electrical parameters shown in the following tables.

TABLE 8

Exemplary Slimport AVD High-speed link Transmitter System Parameters (6.75 Gbps and 3.375 Gbps mode)

| Symbol | Parameters | Min | Nom | Max | Units | Comments |
|---|---|---|---|---|---|---|
| UI_TURBO | Unit interval for turbo mode | | | 148 | ps | |
| UI_HALF_TURBO | Unit interval for half turbo speed | | | 296 | ps | |
| Down_Spread_Amplitude | Link clock down-spreading amplitude | 0 | | 0.5 | % | |
| Down_Spread_Frequency | Link clock down-spreading frequency | 30 | | 33 | kHz | |
| $C_{TX}$ | AC Coupling Capacitor | 75 | | 200 | nF | |

TABLE 9

Exemplary Slimport AVD High-speed link Transmitter TP2 Parameters (6.75 Gbps and 3.375 Gbps mode)

| Symbol | Parameter | Min | Nom | Max | Units | Comments |
|---|---|---|---|---|---|---|
| VTX-OUTPUT-RATIO_HBR_tur | Ratio of Output Voltage Level 2/Level 0 | 5.2 | | 6.9 | dB | Measured on non-transition bits at Pre-emphasis level 0 setting |
| | Ratio of Output Voltage Level 2/Level 1 | 1.6 | | 3.5 | dB | |
| | Ratio of Output Voltage Level 3/Level 2 | 1 | | 4.4 | dB | |
| VTX-PREEMP-OFF | Maximum Pre-emphasis when disabled | | | 0.25 | dB | Pre-emphasis Level 0 setting may not show any pre-emphasis at TP2 to prevent link training issues. |
| VTX-PREEMP-DELTA | Delta of Pre-emphasis Level 1 vs. Level 0 | 2 | | | dB | Applies to all valid voltage settings. Measured at Pre-emphasis Post Cursor2 Level 0. Support for Pre-emphasis Level 3 may be optional. |
| | Delta of Pre-emphasis Level 2 vs. Level 1 | 1.6 | | | dB | |
| | Delta of Pre-emphasis Level 3 vs. Level 2 | 1.6 | | | dB | |
| VTX-DIFF_REDUCTION | Non-transition reduction Output Voltage Level 2 | | | 3 | dB | VTX_DIFF at each non-zero nominal pre-emphasis level may not be lower than the specified amount |
| | Non-transition reduction Output Voltage Level 1 | | | 3 | dB | less than VTX_DIFF at the zero nominal pre-emphasis level. |

TABLE 9-continued

Exemplary Slimport AVD High-speed link Transmitter TP2 Parameters
(6.75 Gbps and 3.375 Gbps mode)

| Symbol | Parameter | Min | Nom | Max | Units | Comments |
|---|---|---|---|---|---|---|
| | Non-transition reduction Output Voltage Level 0 | | | 1.4 | dB | |
| VTX-PREEMP-POST2-DELTA | Delta of Pre-emphasis Post Cursor2 Level 1 vs. Level 0 | −0.45 | | | dB | Measured on 2nd TBIT at Pre-emphasis Level 0. Support for Pre-emphasis Post Cursor2 may be optional. |
| | Delta of Pre-emphasis Post Cursor2 Level 2 vs. Level 1 | −0.5 | | | dB | |
| | Delta of Pre-emphasis Post Cursor2 Level 3 vs. Level 2 | −0.6 | | | dB | |
| VTX-DIFFp-p-MAX | Max Output Voltage Level | | | 1.38 | V | For all Output Level and Pre-emphasis combinations. |
| LTX-SKEW-INTRA_PAIR | Lane Intra-pair Output Skew | | | 30 | ps | |

TABLE 10

Exemplary Slimport AVD High-speed link Receiver System Parameters
(3.375 Gbps mode)

| Symbol | Parameters | Min | Nom | Max | Units | Comments |
|---|---|---|---|---|---|---|
| UI_TURBO | Unit interval for turbo mode | | 296 | | ps | |

TABLE 11

Exemplary Slimport AVD High-speed link Receiver TP3 Parameters
(6.75 Gbps and 3.375 Gbps mode)

| Symbol | Parameter | Min | Nom | Max | Units | Comments |
|---|---|---|---|---|---|---|
| TTX-TJ_8b10b_HBR_tur | Maximum TX Total Jitter | | | 0.62 | UI | For HBR_tur. Measured at 1E-9 BER using the HBR2 Compliance EYE pattern. |
| TTX-DJ_8b10b_HBR_tur | Maximum TX Deterministic Jitter | | | 0.49 | UI | |
| TTX-TJ_D10.2_HBR_tur | Maximum TX Total Jitter | | | 0.40 | UI | For HBR_tur. Measured at 1E-9 BER using the D10.2 compliance pattern. |
| TTX-DJ_D10.2_HBR_tur | Maximum TX Deterministic Jitter | | | 0.25 | UI | |
| TTX-RJ_D10.2_HBR_tur | Maximum TX Random Jitter | | | 0.23 | UI | |
| TTX-DIFFp-p_HBR_tur | TX Differential Peak-to-Peak EYE Voltage | 90 | | | mV | For HBR_tur. Measured at 1E-9 BER using the HBR2 Compliance EYE pattern. |

TABLE 11-continued

Exemplary Slimport AVD High-speed link Receiver TP3 Parameters
(6.75 Gbps and 3.375 Gbps mode)

| Symbol | Parameter | Min | Nom | Max | Units | Comments |
|---|---|---|---|---|---|---|
| TTX-DIFFp-p_RANGE_HBR_tur | TX Differential Peak-to-Peak EYE Voltage Measurement Range | 0.375 | | 0.625 | UI | For HBR_tur. Uses 0.5 CDF (Cumulative Distribution Function) of the jitter distribution as the 0 UI reference point. TX Differential Peak-to-Peak EYE Voltage requirement can be met anywhere within this UI range. |

C-Wire Electrical Parameters

The C-wire electrical parameters may be as listed in Table 12 below.

TABLE 12

Exemplary C_WIRE Electrical Parameters

| Parameter | Min. | Typ. | Max | Unit | Comments |
|---|---|---|---|---|---|
| C_WIRE Pull-down Resistor | 620K − 1% | 620K | 620K + 1% | Ω | Pulled down in a SP cable adapter |
| $UI_{C\_WIRE}$(1 Mbps) | 0.45 | 0.5 | 0.55 | us | |
| $UI_{C\_WIRE}$(2 Mbps) | 0.225 | 0.25 | 0.275 | Us | |
| $UI_{C\_WIRE}$(5 Mbps) | 0.09 | 0.1 | 0.11 | Us | |
| $UI_{C\_WIRE}$(10 Mbps) | 0.045 | 0.05 | 0.055 | Us | |
| $V_{swing}$ | 0.39 | | 1.0 | V | C_WIRE swing level at the transmitter |
| | 0.32 | | 0.9 | V | C_WIRE swing level at the receiver |
| $V_{term}$ | | 50 | | Ω | Termination resistor on C_WIRE |
| Others | Please refer to Table 3-3 in DisplayPort 1.1a specification | | | | |

SlimPort AVD Power Delivery

SlimPort AVD may support power delivery from source device to the sink or vice versa. When the power may be delivered from the SlimPort source device to the SlimPort sink device, 3.3V power may be generated by the source device. The maximum current provided by the source device may be defined in the MyDP specification. When the power is delivered from SlimPort sink device to the SlimPort source device, 5V power may be provided by the sink and the current can be negotiated between the source and the sink device.

The charging function may be supported, with power from SlimPort AVD sink side connected with the SP_PWR pin of the SlimPort AVD interface and providing power and charging capabilities. There may be two types of charging methods, i.e., normal charging and fast charging. Normal charging refers to charging current less than 1A, while fast charging has charging current greater than 1A. Dead battery charging may be also supported through the protocol d herein.

Power Delivery Related DPCD Registers

The SlimPort AVD power delivery may be implemented through the DPCD registers shown in Table 13.

TABLE 13

Exemplary DPCD registers for SlimPort AVD power delivery

| DPCD Address | Definition | Read/Write |
|---|---|---|
| 00520h | SP_PWR_STATUS<br>Bit 0 = SP_PWR_GENERATION_CAP<br>1 = SP sink is capable of generating power<br>0 = SP sink is not capable of generating power<br>Bit 1 = POWER_AVAILABLE<br>1 = The SP sink is able to provide power to the source device<br>0 = The SP sink is not able to provide power to the source device<br>Bit 5:2 = SP_POWER_DRIVING_CAP<br>The driving capability of connected SP sink power in mA.<br>0000 - up to 50 mA<br>0001 = up to 100 mA<br>0010 = up to 150 mA<br>0011 = up to 200 mA<br>0100 = up to 500 mA<br>0101 = up to 900 mA<br>0110 = up to 1000 mA<br>0111 = up to 2000 mA<br>1000 = up to 3000 mA<br>1001 = up to 5000 mA<br>1010 = up to 8000 mA<br>1011 = up to 10000 mA<br>Others = Reserved<br>Bit 6 = RESERVED<br>Bit 7 = POWER_DELIVERY_ENABLED<br>0 = The sink device is providing power to the source device<br>1 = the sink device is not providing power to the source device | Read-Only |
| 00521h | SP_PWR_CONTROL<br>Bit 0 = DOWNSTREAM_TO_SP_SOURCE_ENABLE<br>1 = Enable a SP sink device to send the 5 V power to the source device<br>0 = Disable a SP sink device to send the power to the source device. | R/W |

TABLE 13-continued

Exemplary DPCD registers for SlimPort AVD power delivery

| DPCD Address | Definition | Read/Write |
|---|---|---|
| | Bit 4:1 = DRIVING_CURRENT_REQUEST<br>Source requests different driving current from sink device.<br>0000 = requests 50 mA<br>0001 = requests 100 mA<br>0010 = requests 150 mA<br>0011 = requests 200 mA<br>0100 = requests 500 mA<br>0101 = requests 900 mA<br>0110 = requests 1000 mA<br>0111 = requests 2000 mA<br>1000 = requests 3000 mA<br>1001 = requests 5000 mA<br>1010 = requests 8000 mA<br>1011 = requests 10000 mA<br>Others = reserved, sink would assume 50 mA request<br>Bit 6:5 = Reserved<br>Bit 7= REQUEST_ACK<br>0 = sink device didn't acknowledge the driving current request from the source<br>1 = sink device acknowledged the driving current request from the source | |

SlimPort Power Delivery from Source Device to the Sink Device

When the SlimPort source device is first connected with the SlimPort sink device, it may drive the SP_PWR with 3.3V no matter if the sink device is self-powered or not. The sink device may or may not use the SP_PWR to drive itself. If the source device is self-powered, such as a dock attached to an external power source, the sink device may decide not to use the SP_PWR provided by the source device. However, if the sink device, such as a particular cable adapter, does not provide its own power, then it may require SP_PWR from the source device to power itself. If the sink device uses the SP_PWR, it may not exceed the 500 mA driving current limit defined in the MyDP specification.

SlimPort Power Delivery from Sink Device to the Source Device

When SlimPort sink device is connected with a source device and the sink device can provide power, then Bit 0 of DPCD register 0x520 may be set to high, and Bit 1 of DPCD register 0x520 may be set to high when the sink is ready to drive the source device. The register bits 4:1 of the same register may be set based on the driving capability of the connected sink device. The related interrupt bit 'POWER STATUS CHANGE' (DPCD register 0x00511h bit 5) may also be asserted. The source device, once it detects the power is available, can enable the power on the SP_PWR pin by setting register bit 0x00521h bit 0. The source device can also request different driving current by setting register bit 4:1 and checking the acknowledge status on bit 7 before or after enabling the power. The default driving current from the sink device may be 500 mA.

SlimPort Power Delivery Role Swap

When the SlimPort source device and sink device is connected and SP_PWR is driven by either the source device or the sink device, sometimes the power delivery role may need to swap. There may be two situations:

1. SP_PWR is Driven by the Source Device

In this case, when the sink device has the capability to drive the SP_PWR, it may set the related DPCD register bits on register 00520h to inform the source device. The source device can negotiate the driving current before enabling sink driving the SP_PWR pin. The SlimPort dead battery charging scheme applies here for the sink device to automatically send power to SP_PWR to charge the battery of the source device.

2. SP_PWR is Driven by the Sink Device

When the SP_PWR is being driven by the sink device, there may be no need to switch the power delivery source. There may be only one exception where the sink device suddenly loses power, e.g., the sink device has a detachable power supply and the power supply is first plugged in then suddenly is pulled out. When this happens, the source device needs to send 3.3V power to the SP_PWR and drive the sink device immediately. The transition itself may not involve any protocol and it may not interrupt the normal working of the sink device. Further details of how to implement this transition may be implementation specific.

SlimPort Dead Battery Charging Scheme

The sink device may be connected with a source device which has a dead battery. The sink device may have a dead battery detection scheme so that it can automatically send 5V power to the source device without any command from the source. The dead battery detection scheme may be as follows in some embodiments:

A) The sink device, once powered by an external power source, sets register bit 00520h bit 0 and 00520h bit 1. The sink device also sets interrupt bit 00511h bit 5.

B) The sink device starts a timer which takes 1.5 seconds to expire.

C) The sink device checks the DPCD register access within 1.5 second timer. If there is no DPCD register access until the timer expires then the sink device would decide that the source device has a dead battery and may drive 5V power supply to SP_PWR pin to charge the source device with default 500 mA current.

D) The source device once activated can then negotiate higher driving current through DPCD registers as described earlier.

The dead battery charging scheme may be applied by the sink device whenever an external power connect event happens. There may be a situation where the sink device is not connected to the source device once it is powered. In such instance, the 5V power may be present on the SP_PWR pin when it is connected to an active source device. The design of the source device may be able to avoid any damage when the 5V power is present on the SP_PWR while the source device is driving the 3.3V output. The source device may put a power switch between the 3.3V output and the SP_PWR pin. When there is 5V power driving the SP_PWR by the sink device, the power switch may be shut down so that the 5V does not short with the 3.3V. When the 5V driving is disabled at the sink side, the power switch may be immediately turned on to drive the SP_PWR with 3.3V.

Figure 20A:
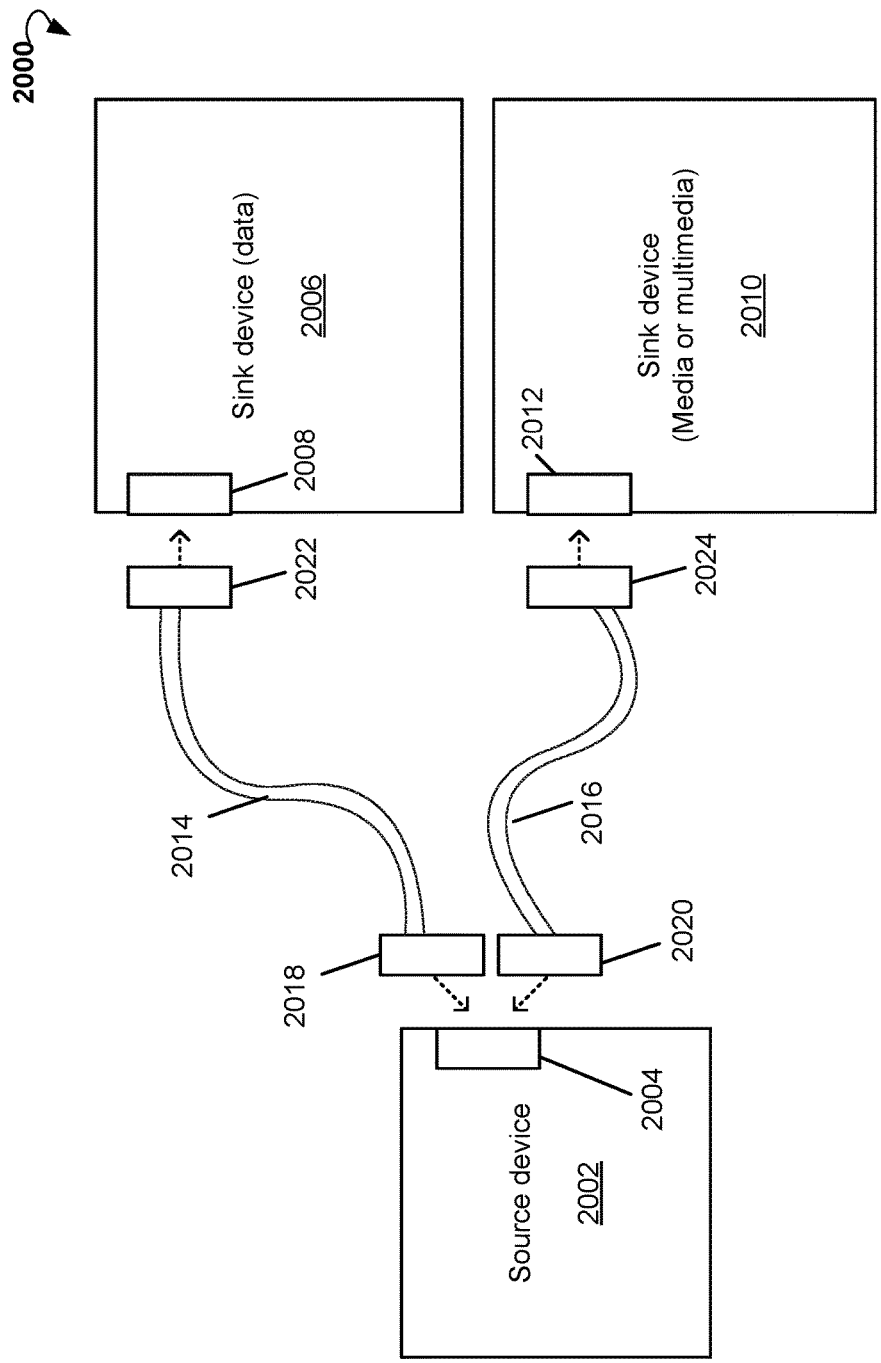
FIG. 20A is an example block diagram of an environment for a dual-mode data transfer of uncompressed media (or multimedia) contents or data communications.

FIG. 20A is an exemplary block diagram of an environment 2000 for dual-mode data transfer of uncompressed media (or multimedia) contents or data communications. The environment 2000 includes a system for transferring data according to various embodiments. The environment 2000 includes a source device 2002, a first sink device 2006, and a second sink device 2010. Source device 2002 has a USB port 2004, first sink device 2006 includes a USB port 2008, and second sink device 2010 includes a DisplayPort port 2012.

Source device 2002 may provide an output of data in USB format or in another data transmission format over port 2004. Source device 2002 may communicate with first sink device 2006 via cable 2014 and with second sink device 2010 via cable 2016. An exemplary source device 2002 is discussed in more detail below with respect to FIG. 20B.

The USB port 2004 and USB port 2008 may be one of various types including, but not limited to, a Micro-USB connector (a 5-pin connector having just 5 pins) in accordance with a USB 3.0 specification standard, a Mini-USB connector in accordance with a USB 2.0 specification standard, and a Micro-USB connector (having just 5 pins) in accordance with a USB 2.0 specification standard. The term "port" may also be referred to herein as a receptacle or connector. Hence, "port" as used herein is merely explanatory for emphasizing the function as a receptacle included as part of a device that may accept a corresponding connector (plug).

A USB cable 2014 may be used to couple source device 2002 with first sink device 2006 via USB ports 2004 and 2008 of devices 2002 and 2006, respectively. Device 2006 may also be considered a master or a slave device, at least because USB transactions are bi-directional. Hence, either end of the USB connection (for example, device 2006) may be considered either the master or the slave device in the connection, depending on who controls the transaction and what devices are connected on both sides. The USB cable 2014 may have a USB connector 2018 at one end and a USB connector 2022 at the other end. The USB connectors 2018 and 2022 may each be configured to "plug" into the corresponding USB ports 2004 and 2008.

Media cable 2016 may be used to couple source device 2002 with second sink device 2010. Media cable 2016 includes a connector 2020 at one end and a connector 2024 at the other end. The connector 2020 may be a USB connector configured to plug into port 2004 of source device 2002, and connector 2024 may couple to port 2012 of the second sink device 2010. Media cable 2016 may include conductors, circuits and other components to couple the connectors 2020 and 2024.

First sink device 2006 may receive and/or transmit data in accordance with a USB standard or protocol. Though source device 2002 may typically act as a "host" in a connection with first sink device 2006, first sink device 2006 may also act as a host in the connection. Examples of first sink device 2006 include a camera, smart phone, a video cam, and other suitable devices.

Second sink device 2010 may receive media (audio or video) or multimedia (both audio and video) signals via the media cable 2016 and provide a media output (video and/or audio) or otherwise process the received data. Port 2012 on second sink device 2010 may be a media or multimedia port. In some embodiments, second sink device 2010 is a Display Port compatible device, and port 2012 is configured to receive a DisplayPort compatible connection. Port 2012 and connector 2024 may also be compatible with other media or multimedia standards. Examples of sink device 2010 include a projector, television, or other media or multimedia capable device.

Figure 20B:
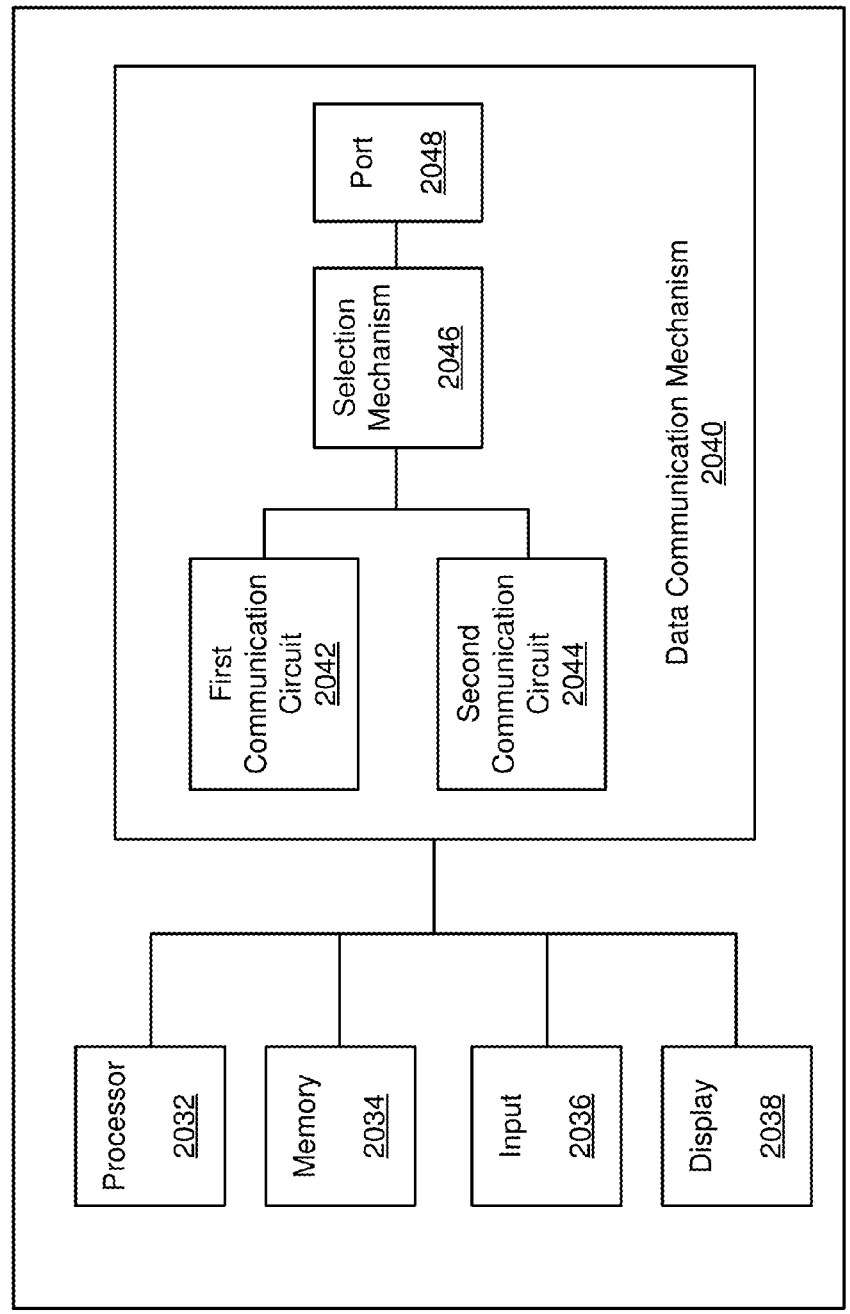
FIG. 20B is a block diagram of an example source device.

FIG. 20B is a block diagram of an exemplary source device 2050. Source device 2050 may be used to implement source device 2002 of FIG. 20A. Source device 2050 includes a processor 2032, memory 2034, input 2036, display 2038, and data communication mechanism 2040. Exemplary source device 2050 may include additional or fewer components that those illustrated in FIG. 20B.

Processor 2032 may be used to execute instructions that are stored in memory 2034. Processor 2032 may be implemented by one or more processors, one or more controllers, and other devices with execute instructions and control other devices.

Memory 2034 may include a main memory for storing instructions as well as mass storage device, such as a magnetic disk drive or an optical disk drive and the like. The mass storage device may include a non-volatile storage device for storing data and instructions for use by processor 2032.

Input 2036 may include one or more mechanisms for receiving data from a user or other system, such as but not limited to a keypad, various buttons, a touch screen, one or more microphones, and other input devices.

Display 2038 may be a screen for providing an output to a user. The interface may be in the form of video or other media. The output may also be provided as audio, wireless data signal, or in some other data format over a suitable output mechanism (not illustrated in FIG. 20B).

Data communication mechanism 2040 may include a first communication circuit 2042, second communication circuit 2044, selection mechanism 2046, and port 2048. Selection mechanism 2046 may detect a connection type at port 2048. Based on the detected connection type, selection mechanism 2046 may enable communication through port 2048 for either first communication circuit 2042 or second communication circuit 2044. The communication circuits 2042 and 2044 may communicate using different protocols, such as a USB 2.0 protocol, USB 3.0 protocol, a DataPort protocol, or some other protocol. The data signals sent by the different protocols of communication circuits 2042 and 2044 are configured to be sent over the same port 2048. In some embodiments, data communication mechanism 2040 may include more than two communication circuits and selectively configure communication over more than one port of source device 2050.

The source device 2002 may be a device, portable or otherwise, having a USB port 2004. The source device 2002 may be, for example, small enough to be portable for a user, such as a cell phone or other mobile device. Mobile devices typically have a USB port operative for charging the battery of the device, and for data transfer and syncing with another device. The reduced size required for portability and transport may preclude adding another port for providing capability beyond these typical USB port capabilities.

Figure 21:
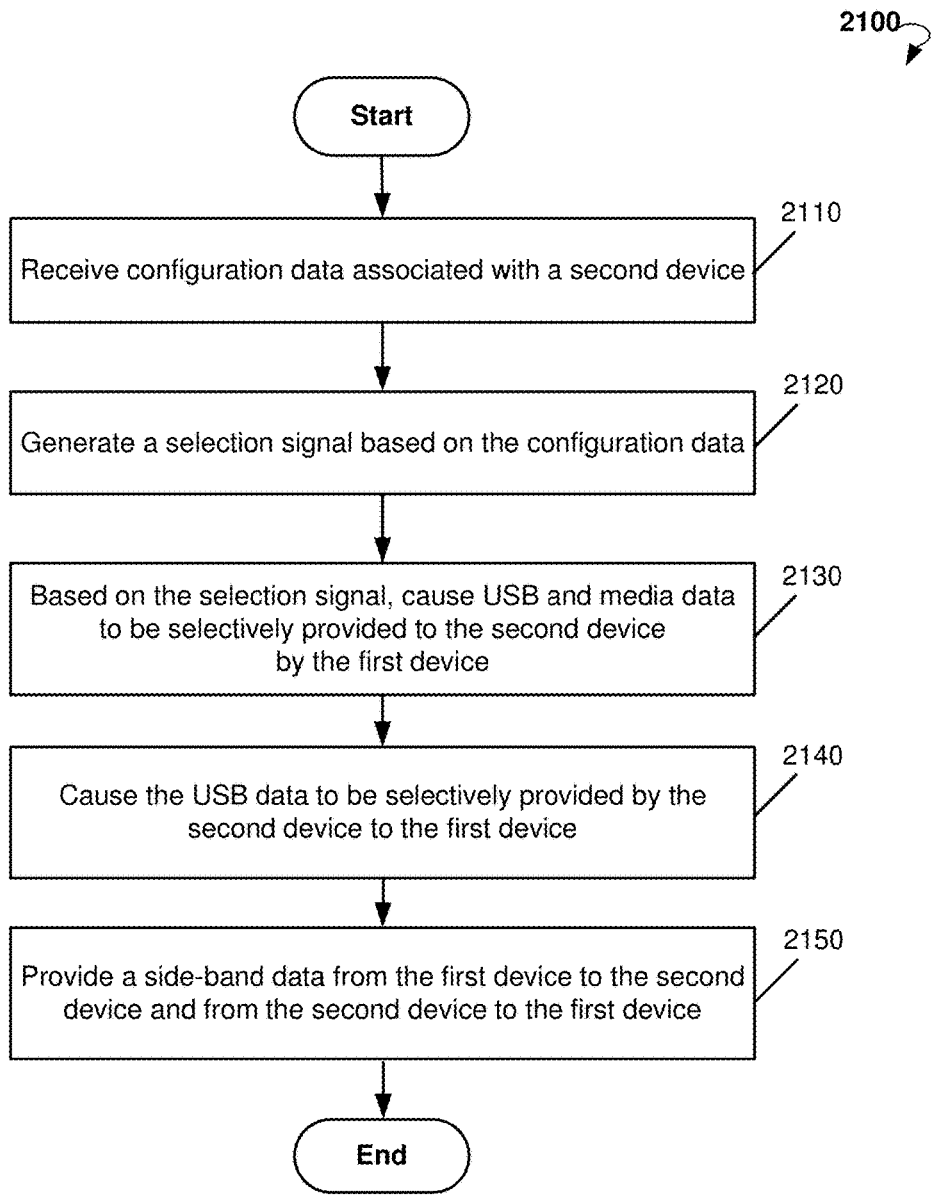
FIG. 21 is a flow chart illustrating a method for selectively communicating data.

FIG. 21 is a flow chart illustrating a method 2100 for selectively communicating data, according to an example embodiment. For example, the data may be transferred between a source device (first device) and a sink device (second device) (as shown in FIG. 1 and FIG. 2) using protocols for forward and backward data transferring as described in various examples in FIG. 4A, 4B, 5A-5D, 6, 7A-7D, 8-19. The method 2100 may commence at operation 2110 with receiving configuration data associated with the second device. At operation 2120, the method 2100 can include generating a selection signal based on the configuration data. At operation 2130, method 2100 can proceed with causing, based on the selection signal, USB and media data to be selectively provided to the second device by the first device. At operation 2140, method may include causing the USB data to be selectively provided by the second device to the first device. In some embodiments, at operation 2150, the method 2100 may proceed with providing a side-band data from the first device to the second device and from the second device to the first device.

The present technology is described above with reference to example embodiments. Therefore, other variations upon the example embodiments are intended to be covered by the present disclosure.

What is claimed is:

1. A method for selectively communicating data between a first device and a second device, the method comprising:
   receiving a configuration data associated with the second device;
   generating a selection signal based on the configuration data; and
   based at least in part on the selection signal, causing the data to be selectively provided to the second device by the first device, the data including Universal Serial Bus (USB) protocol data, uncompressed high definition media data, or a combination thereof, wherein if the selection signal indicates that the second device is configured for receiving both the USB protocol data and the uncompressed high definition media data, causing the combination of the USB protocol data and the uncompressed high definition media data to be provided to the second device by the first device.

2. The method of claim 1, wherein the data is provided from a port associated with the first device to a media connector associated with second device via an electrical circuit, the electrical circuit being coupled to the port and the media connector by an electrical cable.

3. The method of claim 1, wherein the second device is configured to receive the data using at least one of the following standards: DisplayPort data, high definition multimedia interface (HDMI), and Digital Video Interactive (DVI).

4. The method of claim 1, wherein the data is provided at one of a first data transfer rate, a second data transfer rate, a third data transfer rate, and a fourth data transfer rate, the first data transfer rate being 2.7Gbps, the second data transfer rate being 5.4Gbps, the third data transfer rate being 3.375Gbps, and the fourth data transfer rate being 6.75Gbps.

5. The method of claim 4, wherein when being provided at the fourth data transfer rate the data includes one of the following:
   a combination of audio/video data and USB 2.0 data; and
   audio/video data.

6. The method of claim 4, wherein the uncompressed high definition media data is provided in a burst mode by building a first line buffer in the first device and a second line buffer in the second device.

7. The method of claim 1, further comprising causing the data to be selectively provided by the second device to the first device based on the selection signal.

8. The method of claim 7, wherein the data from the second device to the first device is provided at one of a fifth data transfer rate and a sixth data transfer rate, the fifth data transfer rate being 2.7 Gbps and the sixth data transfer rate being 3.375 Gbps.

9. The method of claim 8, wherein the USB protocol data is provided by the second device to the first device in a burst mode by building a first line buffer in the first device and a second line buffer in the second device.

10. The method of claim 9, wherein the data further comprises a side-band communication data, the side-band communication data being provided from the first device to the second device and from the second device to the first device via a single pin of a port associated with the first device at one of a first data transfer rate, a second data transfer rate, or a third data transfer rate, the first data transfer rate being 2 Mbps, the second data transfer rate being 5 Mbps, and the third data transfer rate being 10 Mbps.

11. A system for selectively communicating data between a first device and a second device, the system comprising:
   a universal serial bus (USB) connector having a first plurality of pins;
   a media connector having a second plurality of pins;
   an electrical cable coupling the USB connector to the media connector, the electrical cable including a plurality of conductors; and
   a circuit coupled to at least some of the plurality of conductors of the electrical cable at points between ends of the first plurality of pins of the USB connector and ends of the second plurality of pins of the media connector, the circuit is configured to
   receive a configuration data associated with the second device;
   generate a selection signal based on the configuration data; and
   based at least in part on the selection signal, cause the data to be selectively provided to the media connector, such that the data can be transmitted via the media connector to the second device, the data including Universal Serial Bus (USB) protocol data, uncompressed high definition media data, or a combination thereof, wherein if the selection signal indicates that the second device is configured for receiving both the USB protocol data and the uncompressed high definition media data, causing the combination of the USB protocol data and the uncompressed high definition media data to be provided to the second device by the first device.

12. The system of claim 11, wherein the second device is configured to receive the data using at least one of the following standards: DisplayPort data, high definition multimedia interface (HDMI), and Digital Video Interactive (DVI).

13. The system of claim 11, wherein the data is provided at one of a first data transfer rate, a second data transfer rate, a third data transfer rate, and a fourth data transfer rate, the first data transfer rate being 2.7Gbps, the second data transfer rate being 5.4Gbps, the third data transfer rate being 3.375Gbps, and the fourth data transfer rate being 6.75Gbps.

14. The system of claim 13, wherein when being provided at the fourth data transfer rate the data includes one of the following:
   a combination of audio/video data and USB 2.0 data; and
   audio/video data.

15. The system of claim 13, wherein the uncompressed high definition media data is provided in a burst mode by building a first line buffer in the first device and a second line buffer in the second device.

16. The system of claim 11, further configured to cause the data to be selectively provided by the second device to the first device based on the selection signal.

17. The system of claim 16, wherein the data from the second device to the first device is provided at one of a fifth data transfer rate and a sixth data transfer rate, the fifth data transfer rate being 2.7 Gbps and the sixth data transfer rate being 3.375 Gbps.

18. The system of claim 16, wherein the USB protocol data is provided by the second device to the first device in a burst mode by building a first line buffer in the first device and a second line buffer in the second device.

19. The system of claim 11, wherein the data further comprises a side-band communication data, the side-band communication data being provided from the first device to the second device and from the second device to the first device via a single pin of the USB connector and via a single pin of the media connector at one of a first data transfer rate, a second data transfer rate, or a third data transfer rate, the first data transfer rate being 2 Mbps, the second data transfer rate being 5 Mbps, and the third data transfer rate being 10 Mbps.

20. A non-transitory processor-readable medium having embodied thereon a program being executable by at least one processor to perform a method for selectively communicating data between a first device and a second device, the method comprising:
receiving a configuration data associated with the second device;
generating a selection signal based on the configuration data; and
based at least in part on the selection signal, causing the data to be selectively provided to the second device by the first device, the data including Universal Serial Bus (USB) protocol data, uncompressed high definition media data, or a combination thereof, wherein if the selection signal indicates that the second device is configured for receiving both the USB protocol data and the uncompressed high definition media data, causing the combination of the USB protocol data and the uncompressed high definition media data to be provided to the second device by the first device.

21. The method of claim 5, wherein for the combination of audio/video data and USB 2.0 data being provided at the fourth data transfer rate of 6.75Gbps, the video component, of the audio/video data, is a high resolution video in a 1080p format being at 60Hz.

22. The method of claim 4, wherein, when being provided at the fourth data transfer rate of 6.75 Gbps, the data includes audio/video data comprising a high resolution video having 4K2K resolution and being at 30 Hz.

* * * * *